(12) United States Patent
Kataoka et al.

(10) Patent No.: US 7,079,939 B2
(45) Date of Patent: Jul. 18, 2006

(54) STOP POSITION ESTIMATING APPARATUS OF INTERNAL COMBUSTION ENGINE

(75) Inventors: Kenji Kataoka, Susono (JP); Yasushi Kusaka, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 61 days.

(21) Appl. No.: 10/758,101

(22) Filed: Jan. 16, 2004

(65) Prior Publication Data

US 2004/0153235 A1    Aug. 5, 2004

(30) Foreign Application Priority Data

Jan. 28, 2003    (JP) .............................. 2003-019037

(51) Int. Cl.
*G06G 7/70*    (2006.01)

(52) U.S. Cl. ...................... 701/112; 701/111; 701/113; 701/114; 123/179.3; 123/179.4; 123/491

(58) Field of Classification Search ........ 701/111–114; 123/179.3, 179.4, 491
See application file for complete search history.

(56) References Cited

U.S. PATENT DOCUMENTS 5,346,031 A * 9/1994 Gardner ...................... 180/179
5,557,519 A * 9/1996 Morita ........................... 701/1
6,234,932 B1 * 5/2001 Kuroda et al. .................. 477/3
6,722,332 B1 * 4/2004 Kojima ..................... 123/179.3
6,947,827 B1 * 9/2005 Fuse et al. ................... 701/110

FOREIGN PATENT DOCUMENTS

| JP | 5-248304 | 9/1993 |
| JP | A 9-264235 | 10/1997 |
| JP | A-2001-020797 | 1/2001 |
| JP | A-2001-263147 | 9/2001 |
| JP | A 2002-70629 | 3/2002 |
| JP | A 2002-291296 | 10/2002 |

\* cited by examiner

*Primary Examiner*—Andrew M. Dolinar
*Assistant Examiner*—Johnny H. Hoang
(74) *Attorney, Agent, or Firm*—Oliff & Berridge PLC

(57) ABSTRACT

A stop position control apparatus of an internal combustion engine is applied to a vehicle having of a motor or a generator connected to a crankshaft of the engine, such as an economic-running vehicle and a hybrid vehicle. A rotation position of a motor generator is detected by a motor angle sensor, and a crank angle of the engine is detected by a crank angle sensor. A stop position of the internal combustion engine, at the time of stoppage is estimated based on the rotation position of the motor generator and the crank angle. By utilizing the results, the stop position of the internal combustion engine can be accurately estimated. By detecting a rotation direction of the crankshaft, the stop position of the engine can be accurately estimated even when the engine is rotated in the reverse direction at the time of the engine stopping.

8 Claims, 14 Drawing Sheets

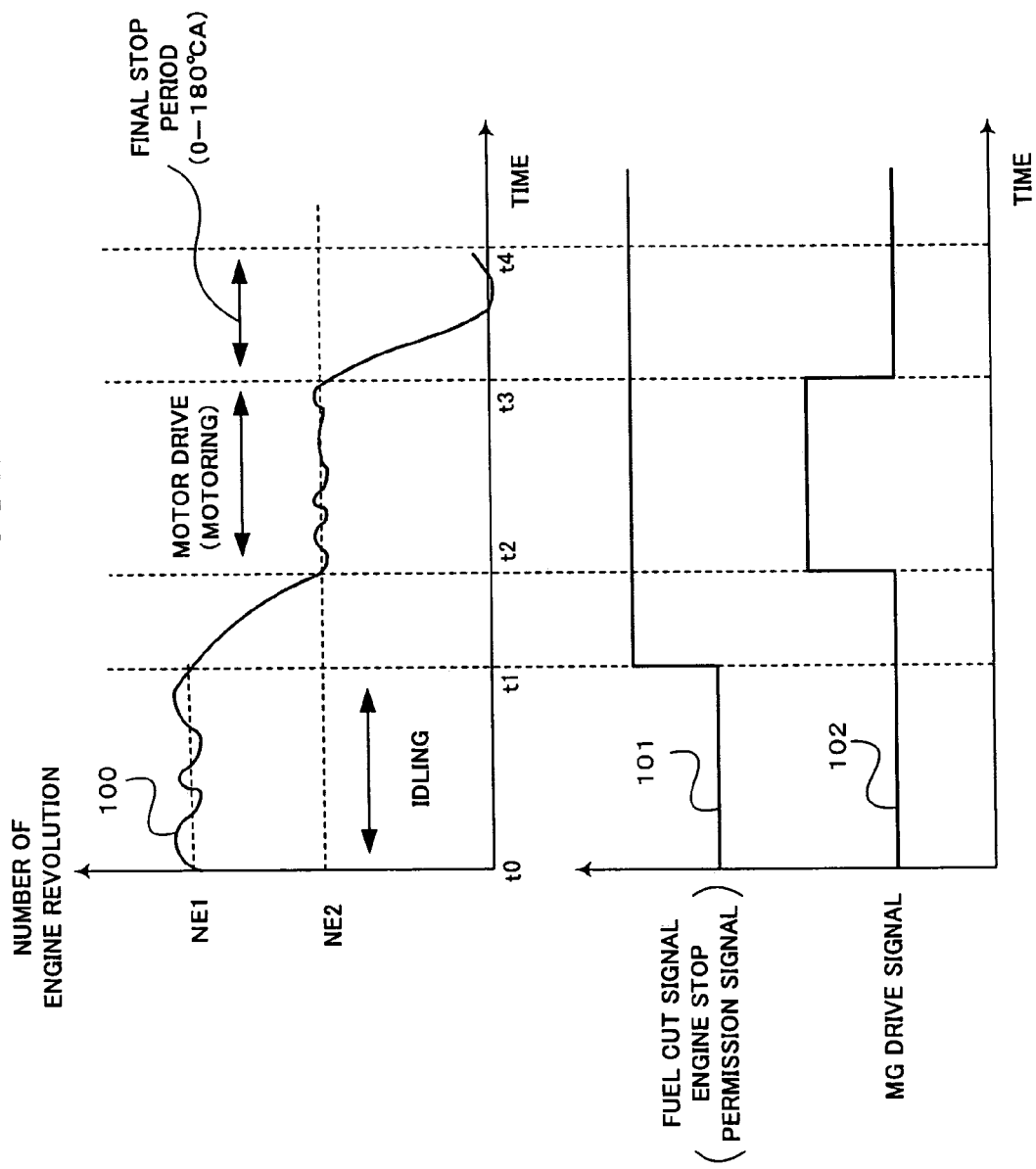

FIG. 8

| | ABSOLUTE CRANK ANGLE | ACCURACY (RESOLUTION) | CYLINDER DISCRIMINATION | TDC DISCRIMINATION | REVERSE ROTATION DETECTION | AT TIME OF LOW REVOLUTION NUMBER |
|---|---|---|---|---|---|---|
| MG POSITION SIGNAL | ×[BELT SLIP] | 3°CA | × | × | ○ | ○ |
| NE SIGNAL | ○ | 30°CA | × | × | × | ×(○) |
| G2 SIGNAL | △[VVT DEVIATION] | 720°CA | ○ | × | × | ×(○) |
| TDC SIGNAL | ○ | 360°CA | × | ○ | × | ×(○) |

* CASE OF MRE IS GIVEN IN ( )

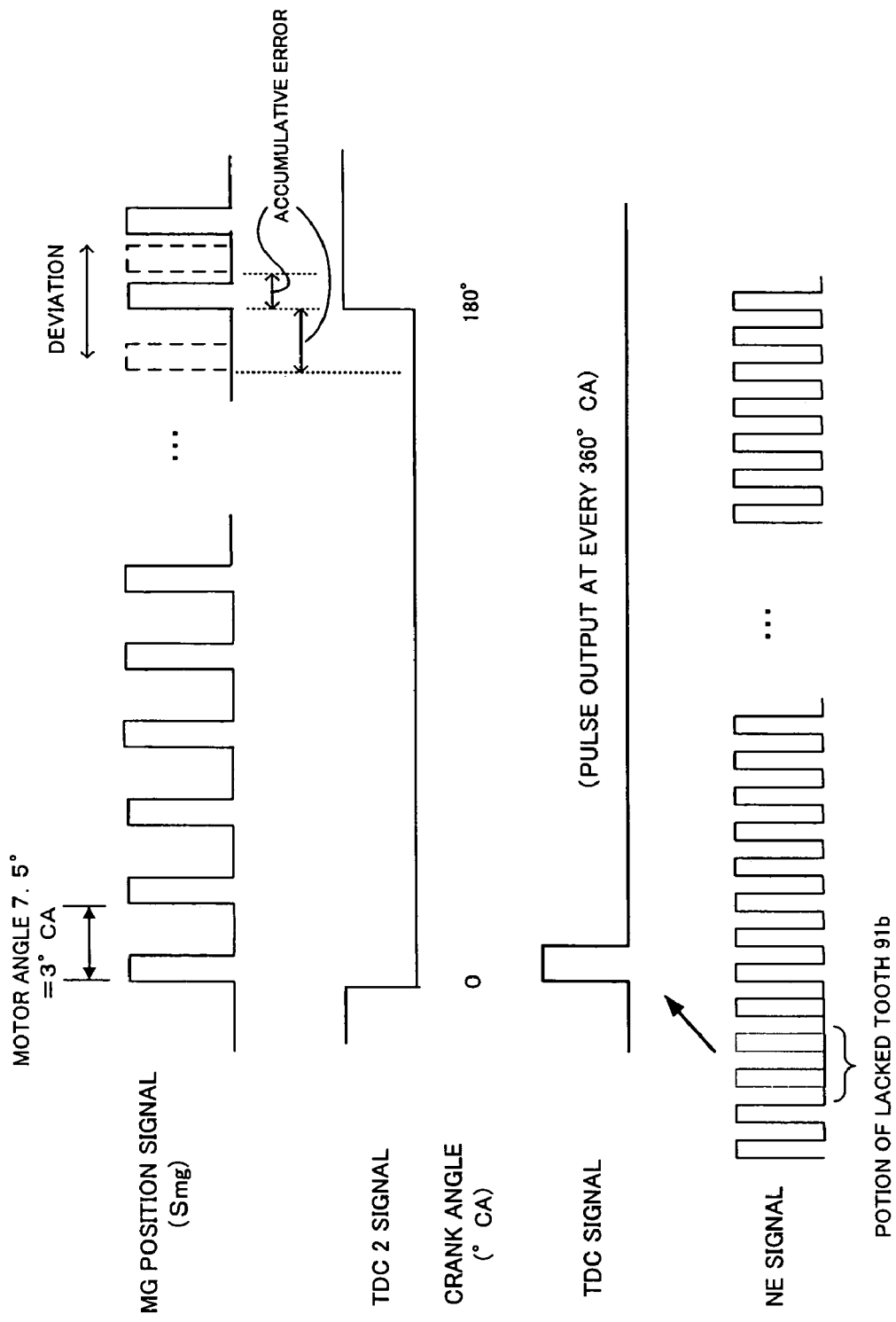

STOP POSITION ESTIMATING APPARATUS OF INTERNAL COMBUSTION ENGINE

BACKGROUND OF THE INVENTION

1. Field of the Invention

The present invention relates to a stop control of an internal combustion engine, and particularly relates to a stop position estimating apparatus for estimating a stop position of an internal combustion engine.

2. Description of Related Art

Recently, there is known an engine stop and start control apparatus for automatically stopping an internal combustion engine (hereinafter, also referred to as "engine") when the vehicle stops and for automatically restarting the engine to start the vehicle when an instruction to start is given in the stopped state, in order to reduce a fuel consumption amount and exhaust gas during idling, from the viewpoint of environmental conservation, resources and energy saving or the like. This control is also called "idling stop" or the like.

It is known that, when the idling stop is automatically carried out, it is effective to control the stop position of the engine in order to minimize required energy at the time of starting the engine. Minimizing the required energy at the time of starting the engine brings about the advantages that an engine starting device used after idling stop such as a motor generator (MG) can be miniaturized, and the useful life of a battery can be elongated by reducing the electric energy.

As a method for controlling the stop position of the engine, there is proposed a method for estimating an engine stop position in consideration of reverse rotation movement at the time of stopping the engine based on the output of a crank angle sensor. For example, see Japanese Patent Application Laid-Open under No. 2002-70629 (hereinafter referred to as Document-1).

As a method related to the stop control of the engine, there is proposed a method for operating a motor generator to stop the engine within a predetermined range, based on an absolute crank angle detected by utilizing a crank angle sensor. For example, see Japanese Patent Application Laid-Open under No. 9-264235.

However, the method for estimating the engine stop position by utilizing only the output of the crank angle sensor, as exemplified in the above-mentioned Document-1, has the problem that the logic of the estimating processing is complicated.

SUMMARY OF THE INVENTION

The present invention is contrived in view of the above-described problem, and its object is to provide a stop position estimating apparatus of an internal combustion engine capable of accurately estimating the engine stop position without requiring complicated arithmetic operation processing.

According to one aspect of the present invention, there is provided a stop position estimating apparatus of an internal combustion engine including: a motor generator having a function of at least one of a motor and a generator interlocked with a crankshaft of the internal combustion engine; a first detecting unit for detecting a rotation position of the motor generator; a second detecting unit for detecting a crank angle of the crankshaft; and an estimating unit for estimating a stop position of the internal combustion engine based on the rotation position of the motor generator and the crank angle.

The above-described stop position control apparatus of the internal combustion engine is applied to a vehicle of a type in which a function of a motor or a generator is connected to a crankshaft of an engine, such as an economic-running vehicle and a hybrid vehicle, for example. The rotation of the engine is transmitted to the motor generator via the crankshaft to rotate the motor generator. The rotation position of the motor generator is detected by the first detecting unit. The angle of the crankshaft of the engine is detected by the second detecting unit. Based on the detected rotation position of the motor generator and the detected crank angle, the stop position at the time of stopping the internal combustion engine, for example, the crank angle is estimated. Since the motor generator is interlocked with the crankshaft of the engine, the rotation position of the motor generator corresponds to the rotation of the engine. Therefore, by utilizing the detected rotation position of the motor generator and the detected crank angle, the stop position of the internal combustion engine can be accurately estimated.

The stop position estimating apparatus of an internal combustion engine may further include: a rotation direction detecting unit for detecting a rotation direction of the internal combustion engine based on the rotation position detected by the first detecting unit, and the estimating unit may estimate the stop position of the internal combustion engine based on the rotation direction and the crank angle detected by the second detecting unit.

When the driving force of the crankshaft is removed at the time of stopping the internal combustion engine, there may occur such a phenomenon that rotation of the crankshaft of the internal combustion engine is reversed by the compression reaction force of the cylinder in the compression stroke just before the engine stops, and thereafter the rotation of the crankshaft is reversed again by the reaction force occurring to the cylinder in the expansion stroke. Therefore, it is possible to accurately estimate the stop position of the internal combustion engine by detecting the rotation direction of the internal combustion engine and estimating the change of the crank angle in consideration of the rotation direction.

The stop position estimating apparatus of an internal combustion engine may further include: a crank angle estimating unit for estimating a crank angle of the internal combustion engine based on the rotation position detected by the first detecting unit; and a correcting unit for correcting the estimated crank angle based on the crank angle detected by the second detecting unit.

Since the motor generator is interlocked with the crankshaft of the internal combustion engine, the crank angle of the engine can be estimated based on the rotation position of the motor generator. The crank angle estimated from the rotation position of the motor generator advantageously has higher resolution than the crank angle generally detected from the crank angle sensor and can detect the reverse rotation of the engine, but the crank angle is not the absolute angle of the crankshaft. On the other hand, the absolute crank angle of the engine can be directly detected by the sensor attached to the engine, such as a crank angle sensor, for example. Therefore, by correcting the relative crank angle with high resolution, which is indirectly obtained based on the rotation position of the motor generator, with the absolute crank angle directly detected from the sensor of the engine, it becomes possible to improve accuracy of the estimated crank angle.

The stop position estimating apparatus of an internal combustion engine may further include a unit for detecting a number of revolution of the internal combustion engine, and the correcting unit may correct the estimated crank angle only when the detected number of revolution is within a predetermined range.

When the number of engine revolution becomes too high, the load of the arithmetic operation processing for estimating the crank angle based on the rotation position of the motor generator increases. When the number of engine revolution becomes too low, the detection accuracy of the crank angle by the sensor or the like attached to the engine is greatly deteriorated. Therefore, the correction by the correcting unit is performed only when the number of engine revolution is within the predetermined range so that the increase in the processing load, the deterioration of correction accuracy and the like can be prevented.

In a preferred embodiment, the correcting unit may correct the estimated crank angle so that the crank angle estimated by the crank angle estimating unit coincides with the crank angle detected by the second detecting unit.

The correcting unit may be configured not to perform correction of the estimated crank angle when an error between the crank angle estimated by the crank angle estimating unit and the crank angle detected by the second detecting unit is larger than a predetermined standard error.

The error between the crank angle estimated based on the rotation position of the motor generator and the crank angle detected from the crankshaft of the engine is generally caused by the slip of the belt connecting, for example, the motor generator and the crankshaft, and/or caused by the arithmetic operation processing for estimating the crank angle from the rotation position of the motor generator. However, such error does not vary so drastically due to its nature. Therefore, the error in the range which may occur during ordinary operation is previously set as a predetermined standard error, and when the error larger than this occurs, it is determined that it occurs due to a sudden cause such as a noise, for example, and correction is not performed. Thus, erroneous correction can be avoided based on the error caused by a noise and the like.

The stop position estimating apparatus of an internal combustion engine may further include a unit for outputting estimation accuracy information indicating that the estimation accuracy is ensured when an error between the crank angle estimated by the crank angle estimating unit and the crank angle detected by the second detecting unit is within a predetermined standard error range.

By this, when the error between the crank angle estimated based on the rotation position of the motor generator and the crank angle detected by the crank angle sensor or the like is within the range of the standard error, the estimation by the present apparatus is performed as scheduled, and the estimation accuracy information indicating that the estimation accuracy is ensured is outputted. Therefore, when the estimation accuracy is ensured, for example, with reference to the estimation accuracy information, it becomes possible to utilize the estimation accuracy information of the stop position to execute various kinds of controls such as utilizing the estimation result during the stop control of the engine at the time of idling stop, controlling the starting manner of engine in accordance with the estimation accuracy, and the like.

The correcting unit may include: an error detecting unit for detecting the error between the crank angle estimated by the crank angle estimating unit and the crank angle detected by the second detecting unit; and a unit for determining the standard error based on a predetermined number of detected errors. Thereby, based on the errors obtained for the predetermined times, for example, the standard error, namely, the range of the errors which are likely to occur when the estimating processing is stably performed can be determined properly.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 5 is a graph showing a transition of a number of engine revolution during an engine stop control;

FIG. 8 is a table showing characteristics of sensor output signals used for crank angle estimating processing;

FIG. 10 is a diagram for explaining a crank angle estimating processing;

DETAILED DESCRIPTION OF THE PREFERRED EMBODIMENT

Preferred embodiments of the present invention will be explained below with reference to the attached drawings.

[Configuration of Vehicle]

First, the description will be given of a schematic configuration of a vehicle to which a stop position estimating method of an internal combustion engine according to the present invention is applied. A stop control apparatus of the internal combustion engine according to the present invention is intended for so-called "economic-running" vehicles, hybrid vehicles and the like to which idling stop technique is applied. "An economic-running vehicle" is a vehicle which is equipped with an electric motor (motor generator) mainly for the purpose of starting the engine and which automatically restarts the engine by the motor generator after stopping the engine by the idling stop control. "A hybrid vehicle" is a power train using an engine and a motor generator as power sources. In a hybrid vehicle, both the engine and the motor generator work in combination in accordance with a running state, or are separately used, and power performance which is smooth and excellent in response can be obtained.

Figure 1:
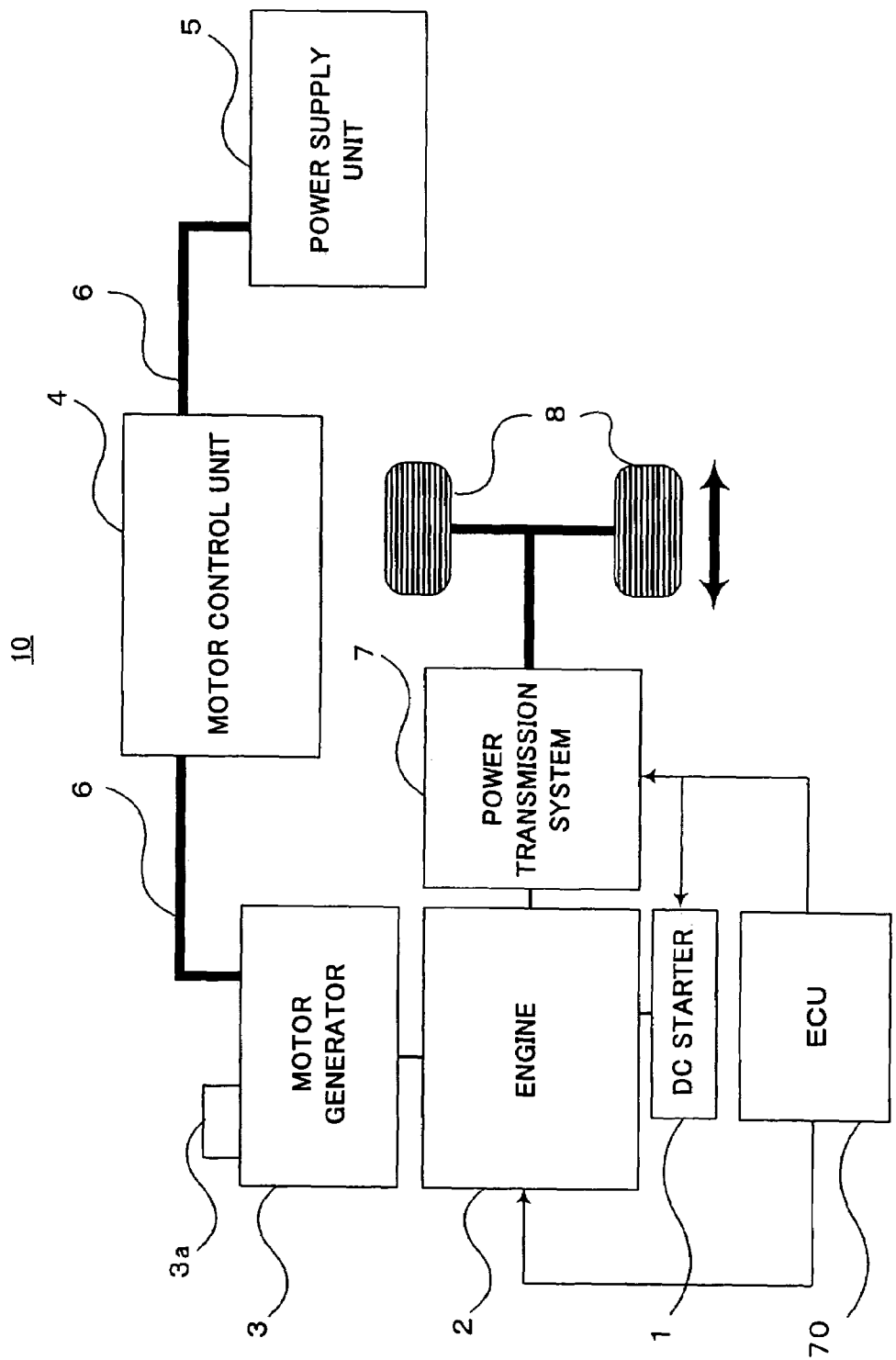
FIG. 1 shows a system configuration of a vehicle, which performs an engine stop position estimating processing according to the present invention.

FIG. 1 shows a system configuration of a vehicle 10 according to the present invention.

As shown in FIG. 1, the vehicle 10 includes a DC starter 1, an engine 2, a motor generator 3 which generates electricity by a driving force outputted from the engine 2 and is drivable as a cell motor on the occasion of starting the engine 2, a motor control unit 4 to control the motor generator 3 and the like, a power supply unit 5 for exchanging electric power with the motor generator 3 and the like via the motor control unit 4, a power supply cable 6 for connecting the motor generator 3, the motor control unit 4 and the power supply unit 5, respectively, a power transmission system 7 for transmitting a driving force generated from the engine 2 to wheels, and the wheels 8.

Next, each of the above-described units will be explained with reference to FIG. 1.

The DC starter 1 is a dc-type cell motor for starting the engine 2. The DC starter 1 has a shaft, receives a power supply from a 12V power supply unit when an ignition switch is turned to an ON state, and rotates the shaft. By the rotation of the shaft of the DC starter 1, a crankshaft of the engine 2 is rotated and the engine 2 is started. Specifically, a pinion gear is mounted on a tip end portion of the shaft of the DC starter 1. The pinion gear is meshed with a ring gear of a flywheel provided at the crankshaft of the engine 2. Consequently, when the DC starter 1 receives a power supply from the 12V power supply unit by the start of the engine 2, the pinion gear is meshed with the ring gear of the flywheel and rotated to rotate the flywheel. As a result, the crankshaft with a predetermined number of pistons being connected is rotated, and therefore the engine 2 can be started by the rotational driving force. Driving the crankshaft to start the engine is called "cranking".

The engine 2 is the internal combustion engine for generating power by exploding air-fuel mixtures (hereinafter simply referred to as "mixture") in cylinders. There are gasoline engines with gasoline as a fuel, diesel engines with light oil and the like as a fuel, and the like as the internal combustion engines. As the gasoline engines, there are four-cycle gasoline engines which complete one cycle of intake, compression, expansion and exhaust during two rotations of crankshaft to generate power, and two-cycle gasoline engines which complete the aforementioned one cycle during one rotation of crankshaft. The vehicle 10 in this embodiment is assumed to be the four-cycle gasoline engine.

Figure 2:
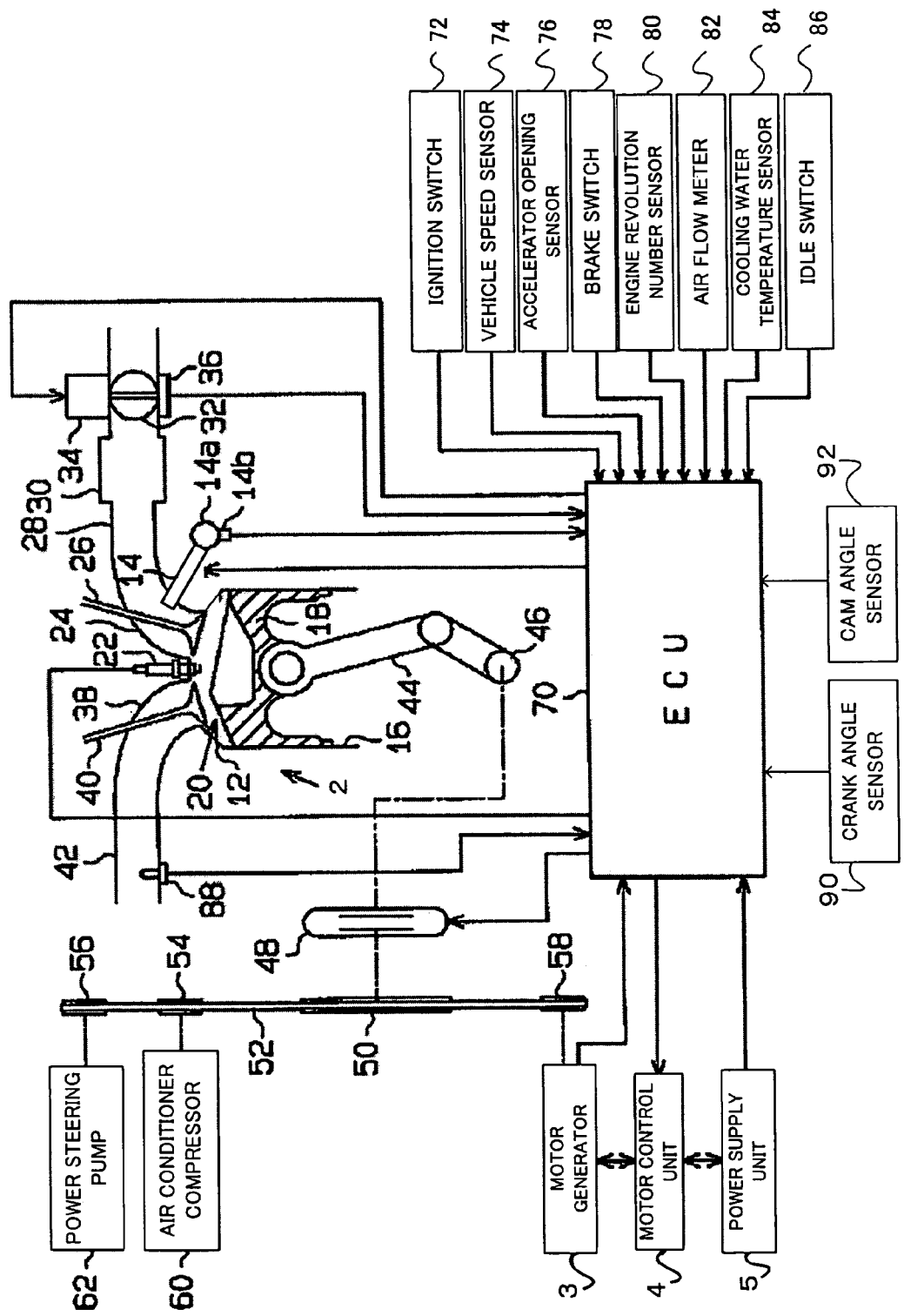
FIG. 2 is a schematic block diagram of an engine according to the present invention.

FIG. 2 shows one example of a schematic configuration of the engine 2.

An intake port 24 formed at a cylinder head 12 is opened and closed by an intake valve 26. Intake air is supplied into the intake port 24 via an intake passage 28. The intake passage 28 is provided with a surge tank 30, and a throttle valve 32 is provided at an upstream of the surge tank 30. An opening (throttle opening TA) of the throttle valve 32 is adjusted by an electric motor 34, and the throttle opening TA is detected by a throttle opening sensor 36.

The engine 2 is a so-called port-injection type engine, and the intake port 24 is provided with a fuel injection valve 14. An air-fuel mixture is generated by the intake air inside the intake port 24 and the fuel injected into the intake port 24, and is introduced into the combustion chamber 20 partitioned by the cylinder block 16, the piston 18 and the cylinder head 12. The ignition plug 22 is disposed at a ceiling portion of the combustion chamber 20, and ignites the mixture introduced from the intake port 24. High pressure fuel is supplied to the fuel injection valve 14 from a high pressure fuel pump (not shown) via a delivery pipe 14a. This enables the injection of fuel into the combustion chamber 20 from the fuel injection valve 14 even in the last period of the compression stroke. Fuel pressure in the delivery pipe 14a is detected by the fuel pressure sensor 14b.

The exhaust port 38 formed at the cylinder head 12 is opened and closed by the exhaust valve 40. Exhaust gas discharged to the exhaust port 38 from the combustion chamber 20 is discharged to the outside via the exhaust passage 42, an exhaust gas purifying catalyst (not shown) and the like.

Reciprocal movement of the piston 18 generated by the combustion of the mixture inside the combustion chamber 20 is converted into rotational movement of the crankshaft 46 via the connecting rod 44. The crankshaft 46 transmits power to the wheels 8 via a torque converter and a transmission not shown.

Apart from such a power transmission system, one end of the crankshaft 46 is connected to the pulley 50 (hereinafter, also called "crankshaft pulley") via the electromagnetic clutch 48. The pulley 50 is capable of transmitting power to and from other three pulleys 54, 56 and 58 by the belt 52. In this example, the compressor 60 for an air conditioner is made drivable by the pulley 54, and the power steering pump 62 is made drivable by the pulley 56. The other pulley 58 (hereinafter, also called "MG pulley") is connected to the motor generator 3. The motor generator 3 has a function as a generator for generating power by the engine driving force from the side of the MG pulley 58, and a function as a motor for supplying the driving force of the motor generator 3 to the side of the MG pulley 58.

An ECU 70 (Engine Control Unit) mainly constructed with a microcomputer includes an input-output device, a storage device, a central processing unit and the like, and supervises and controls the whole system of the vehicle 10. The ECU 70 controls the vehicle 10 to be in an optimal condition based on input information from each sensor and the like provided on the engine 2. Specifically, the ECU 70 detects the fuel pressure from the aforementioned fuel pressure sensor 14b, the throttle opening TA from the throttle opening sensor 36, a revolving number of motor generator from a rotational frequency sensor included in the motor generator 3, the voltage of the power supply unit 5 or the current amount of the power supply unit 5 at the time of charge and discharge, a switching state of the ignition switch 72, a vehicle speed SPD from the vehicle speed sensor 74, a stamping or depressing amount on an accelerator pedal (accelerator opening ACCP) from the accelerator opening sensor 76, presence or absence of stamping on a brake pedal from the brake switch 78, a number of revolution of the crankshaft 46 (i.e., number of engine revolution NE) from an engine revolution number sensor 80, an intake air amount GA from the air flow meter 82, the engine cooling water temperature THW from the cooling water temperature sensor 84, presence or absence of stamping on the accelerator pedal from the idle switch 86, an air fuel ratio detection value Vox from the air fuel ratio sensor 88 provided in the exhaust passage 42, a rotation position of a camshaft from the cam angle sensor 92, and a rotation angle (crank angle) of the crankshaft from the crank angle sensor 90, respectively.

The crank angle sensor 90 is a magnetic type sensor or the like capable of detecting an object to be detected (for example, metal and the like), and is provided at a predetermined position near the crankshaft 46 in the engine 2.

Namely, a gear with projections and depressions being formed on an outer circumference (hereinafter, called "signal rotor") is attached at a predetermined position on the crankshaft 46, and the crank angle sensor 90 is provided at an appropriate position to detect the number of teeth of the signal rotor. The crank angle sensor 90 can detect the rotation angle of the crankshaft 46 (hereinafter, called "crank angle") with resolution of, for example, about 10° to 30° CA. When the crankshaft 46 is rotated, the signal rotor also rotates in synchronization with the crankshaft 46. In this situation, the crank angle sensor 90 detects the number of teeth of the signal rotor and outputs it to the ECU 70 and the like as a pulse signal. The ECU 70 counts the pulse signal outputted from the crank angle sensor 90, and converts it into a crank angle. Thus, the ECU 70 and the like detect the crank angle. The crank angle sensor 90 is directly provided in the engine 2, and therefore it can detect the crank angle as an absolute angle.

The crank angle sensor 90 outputs one pulse signal to the ECU 70 and the like when it detects one of teeth of the signal rotor. Consequently, the pulse signal outputted from the crank angle sensor 90 is in the same output state irrespective of whether the crankshaft 46 is rotated in a normal direction or a reverse direction, and therefore the ECU 70 and the like cannot detect whether the rotation of the crankshaft 46 is in the normal direction or in the reverse direction.

Based on the data thus obtained, the ECU 70 drives the electric motor 34 to adjust the throttle opening TA, and adjusts the injection timing of the fuel by the fuel injection valve 14. Further, when an automatic stop condition is established, the ECU 70 controls the fuel injection from the fuel injection valve 14 to automatically stop the operation of the engine 2. When an automatic start condition is established, the ECU 70 controls the rotation the crankshaft 46 by the driving force of the motor generator 3 transferred via the pulley 58, the belt 52, the pulley 50 and the electromagnetic clutch 48 to start the engine 2. Further, the ECU 70 executes an ignition timing control, and the other necessary controls.

The motor generator 3 is connected to the crankshaft 46 through the pulley 50, the pulley 58 and the belt 52. One of the crankshaft pulley 50 connected to the crankshaft 46 and the MG pulley 58 connected to the motor generator 3 is rotationally driven; whereby power is transmitted to the other via the belt 52.

The motor generator 3 has the function as the motor (electric motor) rotationally driving by receiving power supply from the power supply unit 5 which will be described later, and has the function as the generator (electric generator) for generating electromotive forces at both ends of a three-phase coil when the motor generator 3 is rotated by receiving the rotational driving force from the wheels 8. When the motor generator 3 functions as the electric motor, the motor generator 3 rotates by receiving the electric power supply from the power supply unit 5, and transmits the rotational driving force to the crankshaft pulley 50 to rotate the crankshaft 46 to start the engine 2. On the other hand, when the motor generator 3 functions as the electric generator, the rotational driving force from the wheels 8 is transmitted to the MG pulley 58 at the side of the motor generator via the crankshaft 46 and the crankshaft pulley 50 to rotate the motor generator 3. When the motor generator 3 is rotated, an electromotive force is generated in the motor generator 3, and the electromotive force is converted into a direct current via the motor control unit 4 to supply electric power to the power supply unit 5. Thus, the power supply unit 5 is charged.

Returning to FIG. 1, a motor angle sensor 3a, in which a Hall element or the like is preferably applied to a detection portion, is provided at a predetermined position in the motor generator 3. The motor angle sensor 3a can detect the rotation angle of the shaft of the motor generator 3 with high resolution of substantially 7.5° CA unit. When the motor generator 3 is rotationally driven by receiving the supply of electric power from the power supply unit 5, the motor angle sensor 3a detects the rotation angle of the shaft. Specifically, the motor angle sensor 3a is provided at each of phases U, V and W so as to be able to detect an alternating current of each of the U, V and W phases. Each of the motor angle sensors 3a detects an alternating current of each of the U, V and W phases and converts it into a pulse signal, and outputs it to the motor control unit 4.

The motor control unit 4 is provided in the engine 2, and connected to the motor generator 3 and the power supply unit 5 by the power supply cable 6, respectively. The motor control unit 4 is mainly constructed by an inverter, a converter, a controlling computer or the like.

The inverter converts a high voltage direct current from the power supply unit 5 into a predetermined three-phase alternating current to supply electric power to the motor generator 3. On the other hand, the inverter converts an electromotive force (three-phase alternating current) generated from the motor generator 3 into a direct current suitable for charging the power supply unit 5.

The converter is a DC/DC converting device for converting a predetermined DC voltage into another predetermined DC voltage. Namely, the converter drops the rated voltage (for example, 36 V voltage) of the power supply unit 5 to a predetermined voltage (for example, 12V voltage) to drive auxiliary machines and the like, or charges a 12V power supply unit loaded on the vehicle.

The controlling computer controls the inverter and the converter. Namely, the controlling computer controls the driving torque and power generation amount of the motor generator 3 in the optimal state, and controls the charge amount to the power supply unit 5 in the optimal state to perform charging. Specifically, when the motor generator 3 functions as the electric motor, the controlling computer controls the driving torque and the power generation amount of the motor generator 3 based on the electric power supplied from the power supply unit 5. As a result, the motor generator 3 is controlled in the optimal state to function as the electric motor. On the other hand, when the motor generator 3 functions as the electric generator, the controlling computer supplies a predetermined direct current to the power supply unit 5 based on the electromotive force generated from the motor generator 3 to charge the power supply unit 5.

The motor control unit 4 counts the number of pulse signals outputted from the aforementioned motor angle sensor 3a, and thereby converts the number into the rotation angle of the shaft of the motor generator 3. The motor control unit 4 converts the converted rotation angle of the shaft into the crank angle based on the rotation ratio of the crankshaft pulley 50 and the MG pulley 58. As a result, the motor control unit 4 can detect the crank angle with high resolution of substantially 3° CA unit.

The motor control unit 4 can detect whether the shaft of the motor generator 3 rotates in the normal or in the reverse direction. Namely, the output state of the pulse signal of each of the phases U, V and W differs when the shaft of the motor generator 3 rotates in the normal direction and in the reverse direction. The pulse signal of each of the phases U, V and W when the shaft of the motor generator 3 rotates in the normal direction is in such an output state according to the phase difference as the pulse signal of the U phase is firstly outputted for a predetermined time, thereafter, the pulse signal of the V phase is outputted for a predetermined time later, thereafter, the pulse signal of the W phase is outputted for a predetermined time later, and they are repeated periodically. In contrast, the pulse signal of each of the phases U, V and W when the shaft of the motor generator 3 rotates in the reverse direction is in such an output state as the pulse signal opposite to that of the normal rotation. Namely, when the shaft of the motor generator 3 rotates in the reverse direction, each of the pulse signals for the predetermined time is periodically repeated in the order of the W phase, V phase and U phase. For this reason, the motor control unit 4 can detect whether the shaft of the motor generator 3 rotates in the normal or the reverse direction, based on the phase difference between them.

The power supply unit 5 is a secondary battery such as a lead battery or a nickel hydrogen battery. The power supply unit 5 is placed at, for example, a rear part of the vehicle 10 to increase space efficiency of the vehicle 10. The power supply unit 5 may have a rated voltage of 36V, for example. The power supply unit 5 has high input-output characteristics at the time of actuation of the motor generator 3 or in energy regeneration during braking the vehicle. Specifically, the power supply unit 5 supplies electric power to the auxiliary machines, the motor generator 3 and the like. Electric power supply to the motor generator 3 is mainly performed while the vehicle 10 is stopped. When the vehicle 10 is running or braking, the electromotive force generated from the motor generator 3 is converted into a direct current via the motor control unit 4 and supplied to the power supply unit 5. As a result, the power supply unit 5 can be charged.

The power supply cable 6 is connected between the motor generator 3 and the motor control unit 4, and also between the motor control unit 4 and the power supply unit 5 as described above, and plays the part of passing the direct current and the three-phase alternating current.

The power transmission system 7 is mainly constructed by the torque converter, a lock-up clutch, a transmission, a power switching mechanism and the like. As a result of their cooperation, the power transmission system 7 transmits or shuts off the rotational driving force generated from the engine 2 or the motor generator 3 to or from the wheels 8 in accordance with the running state. Also, the power transmission system 7 transmits the rotational driving force from the wheels 8 to the motor generator 3 at the time of braking and the like.

The wheel 8 includes tires and the like for transmitting the rotational driving force from the power transmission system 7 to a road surface. In this embodiment, rear wheels are shown as the wheels 8.

Next, examples of the crank angle sensor 90 and the cam angle sensor 92 will be explained.

Figure 3:
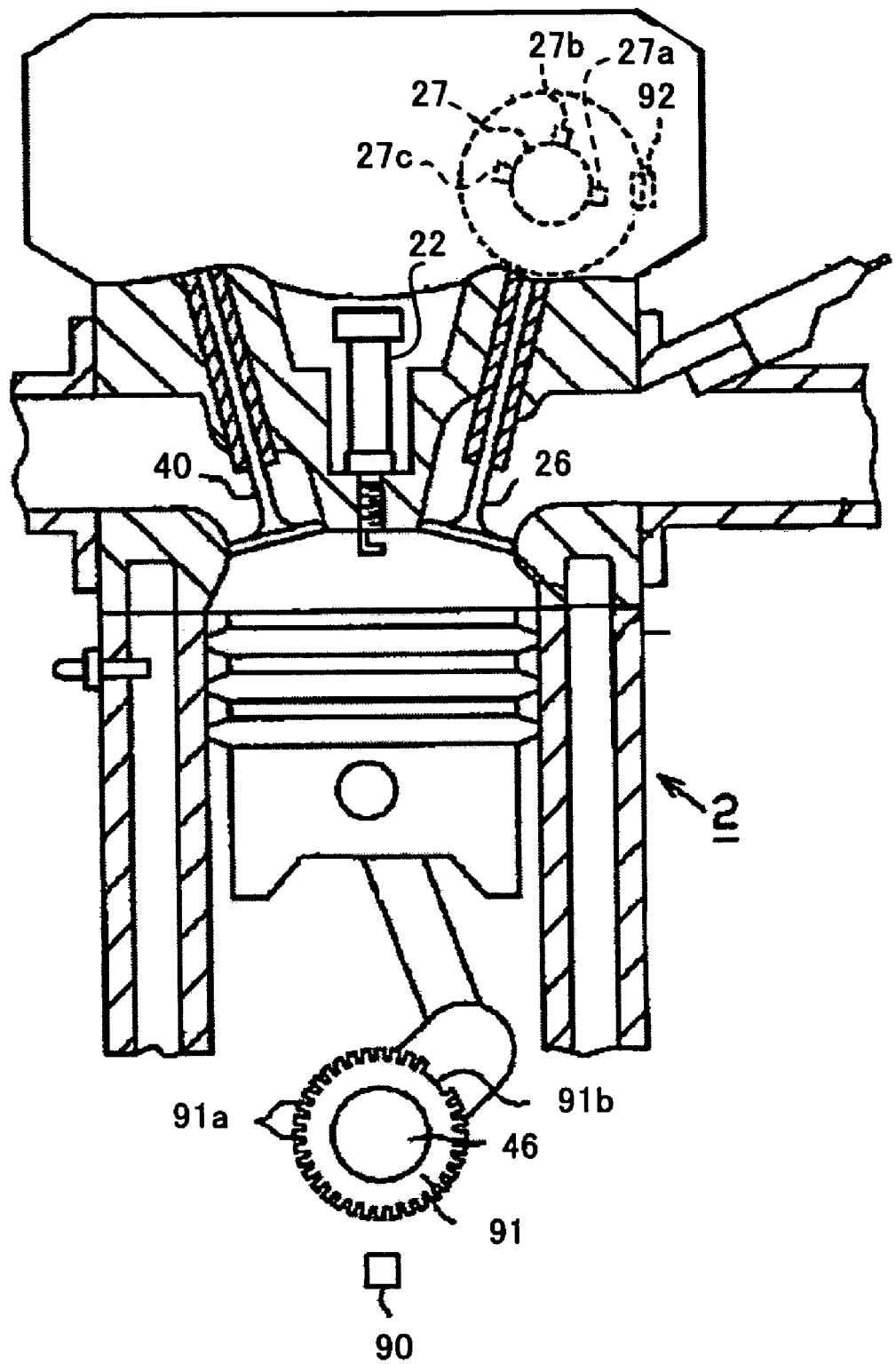
FIG. 3 is a view showing a configuration of a crank angle sensor and a cam angle sensor.

As shown in FIG. 3, a signal rotor 91 (omitted in FIG. 2) is attached to the crankshaft 46. On the outer circumferential portion of the signal rotor 91, 34 teeth (projection portions) 91a formed at equal angles (here, spaced by 10°) with an axis of the crankshaft 46 as a center and a wide lacked tooth (portion with no teeth existing) 91b are provided. The length of the lacked tooth portion 91b corresponds to that of two teeth 91a. The crank angle sensor 90 is provided to oppose the outer circumferential portion of the signal rotor 91. When the crankshaft 46 is rotated, the teeth 91a and the lacked tooth 91b of the signal rotor 91 pass near the crank angle sensor 90 in sequence, whereby a rotation signal of pulse form (hereinafter, called "NE signal") including pulses corresponding to the number of passages of the teeth 91a and the lacked tooth 91b is outputted from the crank angle sensor 90.

On the other hand, three projections 27a, 27b and 27c are provided on the outer circumferential surface of the intake camshaft 27 to be arranged at spaces of 90° (corresponding to 180° CA) with an axis of the intake camshaft 27 as a center. Accordingly, a space between the projection 27a and the projection 27c at both ends is 180° (corresponding to 360° CA). The cam angle sensor 92 for detecting the projections 27a to 27c and outputting the detection signals is provided to oppose these projections 27a to 27c. When the intake camshaft 27 is rotated, the projections 27a to 27c pass near the cam angle sensor 92. As a result, a detection signal in a pulse form is outputted from the cam angle sensor 92 corresponding to each passage of the projections 27a to 27c.

Figure 4A:
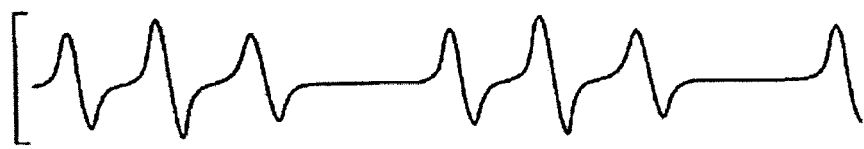
FIGS. 4A to 4D show output signal waveforms of a crank angle sensor and a cam angle sensor.
Figure 4B:
Figure 4C:
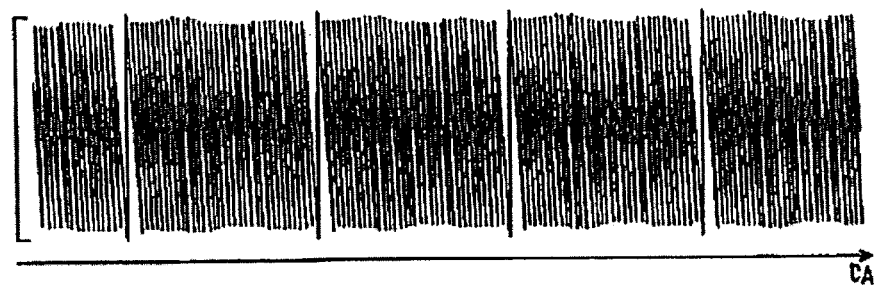
Figure 4D:

Here, the signals obtained from the crank angle sensor 90 and the cam angle sensor 92, which are inputted into the ECU 70 when the engine 2 is driven, are shown in FIGS. 4A, 4B, 4C and 4D. FIG. 4A shows a voltage waveform generated in the cam angle sensor 92 according to the rotation of the intake camshaft 27. FIG. 4B is the waveform obtained by converting the voltage waveform of FIG. 4A into the cam angle signal (G2 signal) in the pulse form. FIG. 4C shows a voltage waveform generated in the crank angle sensor 90 according to the rotation of the crankshaft 46. FIG. 4D is the voltage waveform obtained by converting the waveform of FIG. 4C into the NE signal. In this example, in the NE signal, the number of pulses corresponding to the teeth 91a is 34 per one rotation (360° CA) of the crankshaft 46. Among the rotation signals outputted from the crank angle sensor 90, in the portion corresponding to the lacked tooth 91b, the space between the pulses is made wide due to the absence of 2 pulses. The number of the portions with the wide pulse space is one per one rotation (360° CA) of the crankshaft 46.

The ECU 70 detects rotation phases of the crankshaft 46 and the intake camshaft 27 based on the NE signal from the crank angle sensor 90 and the cam angle signal from the cam angle sensor 92. The ECU 70 performs cylinder discrimination for each cylinder (#1 to #4) based on the rotation phases of the crankshaft 46 and the intake camshaft 27, and selects the cylinder for which the fuel injection and the ignition should be performed from among the cylinders (#1 to #4).

[Operation of Vehicle]

Next, an operation of the vehicle 10 constituted as described above will be explained. The vehicle 10 performs various kinds of operations in accordance with various operation states such as stop, start, normal running, accelerative running, braking or the like.

The engine 2 is in a stopped state during automatic stop (idling stop) of the vehicle 10. When driving of auxiliary machines such as an air compressor, a water pump, a power steering pump or the like is necessary in this state, the motor generator 3 receives the electric power supply from the power supply unit 5 and drives these auxiliary machines without driving the engine 2. However, the engine 2 and the motor generator 3 are rotatably connected with each other via the V belt and the respective pulleys. Therefore, when the shaft of the motor generator 3 is rotated, the rotational driving force is transmitted to the engine 2 in this state. Consequently, in order to drive only the above-described auxiliary machines, the electromagnetic clutch is operated to shut off the rotational driving force from the motor generator 3 so that the crankshaft of the engine 2 is not rotated. This enables to drive only the auxiliary machines without driving the engine 2.

At the time of starting the vehicle 10, namely, when a driver takes his or her foot off the brake pedal while the vehicle is in the idling stop state, the motor generator 3 raises the number of revolution to the vicinity of the number of idling revolution. Then, when the driver stamps or depresses the accelerator pedal, the motor generator 3 rotates the crankshaft of the engine 2 and automatically restarts the engine 2. When a predetermined time elapses from the brake off operation, namely, from the time when the driver takes his or her foot off the brake pedal, the engine 2 may also be automatically restarted to obtain optimal power performance.

At the time of normal running, the vehicle 10 runs by the driving force from the engine 2, which is transmitted to the wheels 8 as in the ordinary vehicles. During normal traveling, if the voltage of the power supply unit 5 is low, the driving force from the wheels 8 is transmitted to the motor generator 3 and the motor generator 3 performs electric power generation. As a result, the motor generator 3 functions as an electric generator, and charges the power supply unit 5 to replenish insufficient electric power of the power supply unit 5 (hereinafter, this operation state will be called "regeneration"). Thereby, the power supply unit 5 is always kept in a proper charged state.

When the vehicle 10 performs uphill running and accelerative running, the motor generator 3 is driven by using the electric power of the power supply unit 5 in addition to the state during the aforementioned normal running, in order to provide proper power performance, and the rotational driving force by the motor generator 3 may be given to the rotational driving force of the engine 2 (hereinafter, this operation state will be called "assist"). This allows the vehicle 10 to obtain high power performance with effective use of the two power sources, i.e., the engine 2 and the motor generator 3.

At the time of braking in deceleration and the like, the driving force by the wheels 8 is transmitted to the motor generator 3 via the power transmission system 7 and the engine 2, and the regeneration is performed.

[Engine Stop Control]

Next, an engine stop control of the vehicle 10 will be explained. As described above, the vehicle 10 performs idling stop, namely, automatically stops the engine 2 at the time the vehicle 10 stops. Thereafter, when the driver takes his or her foot off the brake pedal, the motor generator 3 raises its revolution close to the number of idling revolution of the engine 2. Then, when the driver stamps or depresses the accelerator pedal, the motor generator 3 is rotationally driven, and the rotational driving force automatically restarts the engine 2. In this situation, in order to smoothly start running the vehicle 10 at the time of automatic start of the engine 2, the crank angle is controlled to stop at the optimal crank angle stop position inside the engine 2 at the time of idling stop. In the following example, accurate stop control is performed by effectively utilizing inertia energy of the engine 2 at the time of stopping the vehicle.

A method for controlling the crank angle to the optimal crank angle stop position will be described hereinafter. The optimal crank angle stop position is assumed to be a stop position of the crank angle, which makes it easy to get over the top dead center of the compression stroke at the time of restarting the engine 2 in the cylinder at the compression stroke. For example, in the case of the four-cylinder engine as in this example, the crank angle stop position is optimal if it is within a range of the crank angle of 90° CA to 120° CA In summary, in the ordinary stop control method of the vehicle 10, the ECU 70 executes fuel cut to the engine 2 at a predetermined timing from the idling state, and automatically stops the engine 2 by the inertia energy which the engine 2 has thereafter. However, the inertia energy which the engine 2 has varies each time according to the number of engine revolution at the time of the fuel cut, and the crank angle stop position differs each time accordingly. For this reason, with the ordinary stop control method of the vehicle 10, it is difficult to control the crank angle to stop at the optimal crank angle stop position, and the next engine start load becomes large depending on the crank angle stop position when the vehicle actually stops. Consequently, in relation with the output torque which the motor generator 3 has, the crankshaft of the engine 2 cannot be rotated, and the probability of failure of automatic restart of the engine 2 becomes high.

Consequently, in this example, the number of engine revolution is kept constant at a predetermined timing after the fuel cut, whereby the inertia energy which the engine 2 has is made constant at that point of time. Thereafter, the inertia energy which the engine 2 has at that point of time is utilized to stop the rotation of the engine 2. By this, the crank angle can be reliably controlled to stop at the optimal crank angle stop position every time.

Especially, in this embodiment, the motor generator 3 is used to make the number of engine revolution constant. Namely, a rotational driving force from the motor generator 3 is given to the crankshaft at a predetermined timing after the fuel cut (hereinafter, called "motoring"), whereby the inertia energy which the engine 2 has is made constant. Thus, the crank angle at the time of stopping the engine is controlled to stop at the optimal crank angle stop position. When the crank angle is at the optimal crank angle stop position, the engine start load at the time of starting the engine can be minimized, and the failure of automatic restart of the engine 2 can be effectively prevented.

The manner of controlling the number of engine revolution at the time of stopping the engine with use of the motor generator 3 is shown in FIG. 5. In FIG. 5, the waveform 100 represents the variation of number of engine revolution according to the engine stop control of this embodiment. The waveform 101 represents a fuel cut signal in the engine stop control, and the fuel cut is executed when the fuel cut signal is at an H-level. The waveform 102 represents a drive signal (MG drive signal) of the motor generator 3, and the motor generator 3 is driven during the period in which the MG drive signal is at the H-level.

If it is assumed that the driver takes his or her foot off the accelerator pedal at time t0, the number of revolution of the engine 2 after time t0 substantially becomes the number of idling revolution NE1. If it is assumed that the driver depresses the brake pedal at time t1, the ECU 70 sets the fuel cut signal to H-level at this point of time, and gives an instruction of the fuel cut. When the fuel cut is executed at time t1, the number of revolution of the engine 2 gradually decreases. When the ECU 70 detects that the number of engine revolution decreases down to a predetermined motor setting number of revolution NE2 (time t2), the ECU 70 sets the MG driving signal to the H-level, drives the motor generator 3, and drives the engine 2 by the motor generator 3.

The motor generator 3 drives the engine 2 at the predetermined motor setting number of revolution NE2 for a predetermined period (time t2 to t3), and when the predetermined period elapses, the ECU 70 stops the motor generator 3 (time t3). When the driving force by the motor generator 3 is removed at time t3, the engine 2 is rotated only by the inertia energy which the engine 2 has at that point of time (i.e., time t3), and therefore the number of engine revolution gradually decreases, and the engine 2 stops in the vicinity of time t4.

In this manner, in the present embodiment, the driving of the engine 2 is temporarily switched to the driving by the motor generator 3 at the time of stopping the engine, and after the engine 2 is kept at the predetermined number of revolution NE2, the driving force of the engine is removed. The inertia energy, which the engine 2 has at the point of time when the driving force is removed, is mainly determined by the number of engine revolution at that point of time. Therefore, by removing the driving force after the number of engine revolution is kept at the predetermined number of engine revolution NE2, the engine 2 has the same inertia energy each time, and stops in the same manner.

Figure 6:
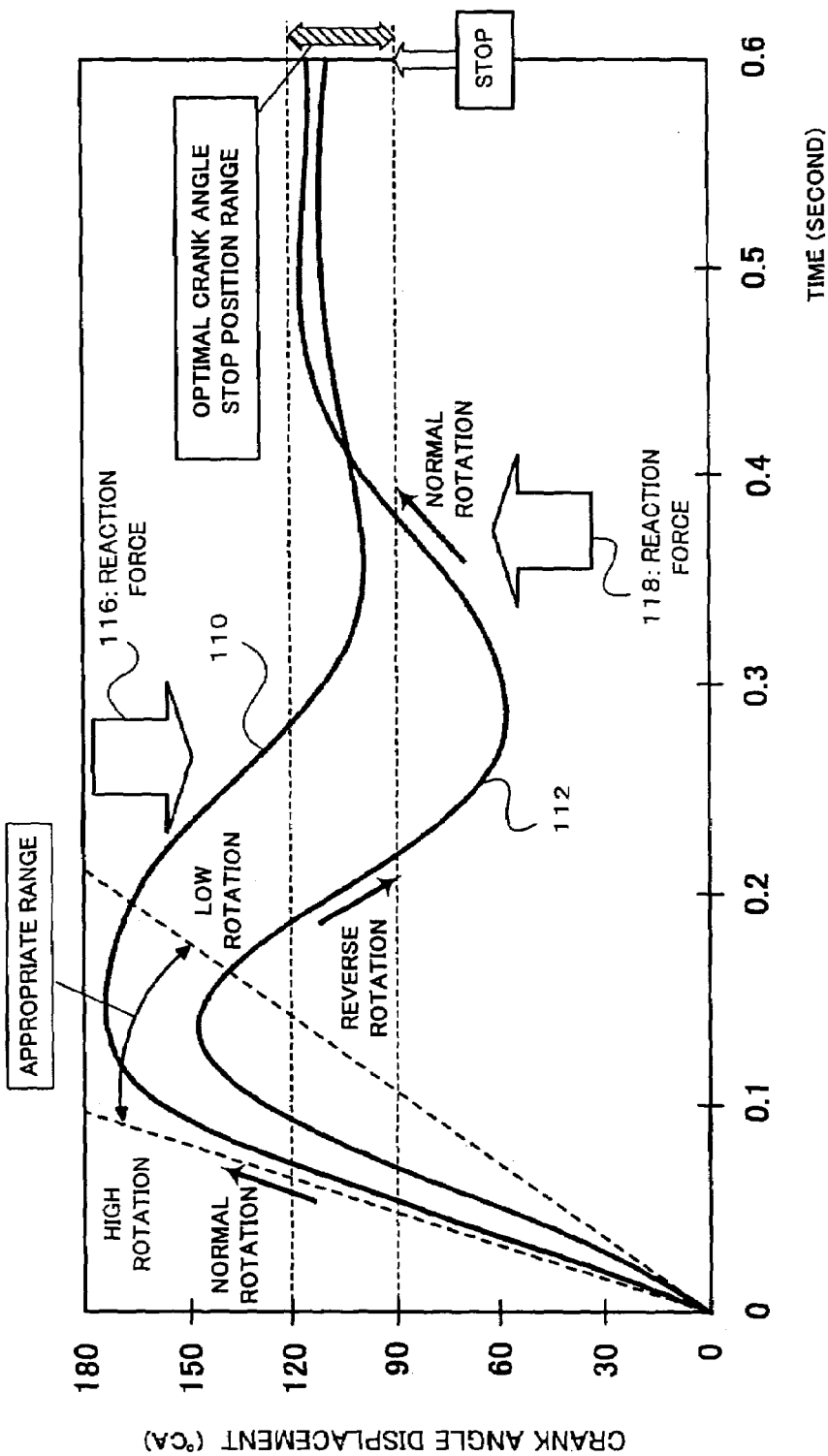
FIG. 6 is a graph showing a state of a change of a crank angle position during the engine stop control.

Next, a behavior of the engine until the engine stops after the driving force is removed at the predetermined number of engine revolution NE2 as described above will be explained. FIG. 6 shows the displacement of the crank angle of the engine 2 after the driving force for the engine 2 is removed. In FIG. 6, the vertical axis shows the displacement of the crank angle (° CA) of a predetermined cylinder. It is noted that the "predetermined cylinder" is the cylinder which is in the compression stroke when the crank angle is displaced from 0° CA to 180° CA, for example, the #3 cylinder. The horizontal axis shows time (second).

Specifically, the vertical axis shows the crank angle displacement (° CA) when the piston corresponding to the predetermined cylinder shifts from the compression stroke to the expansion stroke, and shows the crank angle displacement at every 30° CA from the bottom dead center (0° CA) to the top dead center (180° CA). Meanwhile, the horizontal axis shows the lapse of time (0.6 (second)) from the motoring stopping time (0 (second)) until the crank angle of the predetermined cylinder is controlled to stop at the optimal crank angle stop position at every 0.1 (second).

Next, the graphs in FIG. 6 will be explained. In FIG. 6, two kinds of graphs are shown. They are a graph 110 for the case in which the number of engine revolution at the time of stopping driving (motoring) by the motor generator 3 is high and a graph 112 for the case in which it is low. Namely, during the time from 0 second to 0.1 seconds, the graph 110 with a large gradient shows the crank angle displacement when the number of engine revolution at the time of stopping motoring is high, and the graph 112 with a small gradient shows the crank angle displacement when the number of engine revolution at the time of stopping motoring is low.

First, from 0 second to the vicinity of 0.1 second, it is shown that the piston corresponding to the predetermined cylinder rises from the bottom dead center to the top dead center in the compression stroke. The piston corresponding to the predetermined cylinder rises to the vicinity of the top dead center of the compression stroke just after 0.1 second elapses. At this time, the crankshaft 46 of the engine 2 is rotating in the normal direction.

Thereafter, the piston corresponding to the predetermined cylinder cannot get over the top dead center (180° CA) of the compression stroke, and the crankshaft of the engine 2 is rotated in the reverse direction until it is near 0.3 second. This is for the following reason. As a result that the piston corresponding to the predetermined cylinder approaches the top dead center of the compression stroke, the volumetric capacity in the cylinder gradually becomes smaller, and the pressure becomes higher. In proportion to this, the compression reaction force 116 to push back the piston becomes larger in the cylinder. Accordingly, in the vicinity of the top dead center of the compression stroke, the compression reaction force is the largest in the cylinder, and therefore the inertia energy which the engine has at that point of time cannot beat the compression reaction force. Thus, the piston corresponding to the predetermined cylinder is pushed back to the side of the bottom dead center of the compression stroke. Thus, the piston corresponding to the predetermined cylinder cannot get over the top dead center of the compression stroke, and the crankshaft of the engine 2 is rotated in the reverse direction.

Thereafter, the piston corresponding to the predetermined cylinder moves to the bottom dead center of the compression stroke, and the crankshaft 46 of the engine 2 is rotated in reverse again in the vicinity of 0.3 second. Namely, the crankshaft of the engine 2 is rotated in the normal direction. This is for the following reason. Namely, at this time, the piston corresponding to the predetermined cylinder firstly descends to the bottom dead center of the compression stroke. In the compression stroke, the intake and exhaust valves are both in the closed state, and therefore the volumetric capacity inside the cylinder becomes gradually larger as the piton descends to the bottom dead center of the compression stroke. Consequently, negative pressure is formed inside the cylinder, and the negative pressure becomes gradually larger. Accordingly, the piston corresponding to the predetermined cylinder is returned in the direction of the top dead center again by a reaction force 118 caused by the negative pressure. As a result, the crankshaft of the engine 2 is rotated in the normal direction again.

Thereafter, the inertia energy which the engine 2 has gradually decreases from the vicinity of 0.3 second, and the engine 2 stops after 0.6 second elapses. As a result, the crank angle stop position converges within a range of the crank angle of 90° CA to 120° CA If the crank angle stop position ultimately converges within the range of the crank angle of about 90° CA to 120° CA, it is considered that the crank angle is controlled to stop at the optimal crank angle stop position, and the stop control is successful.

[Engine Stop Position Estimating Processing]

Figure 7:
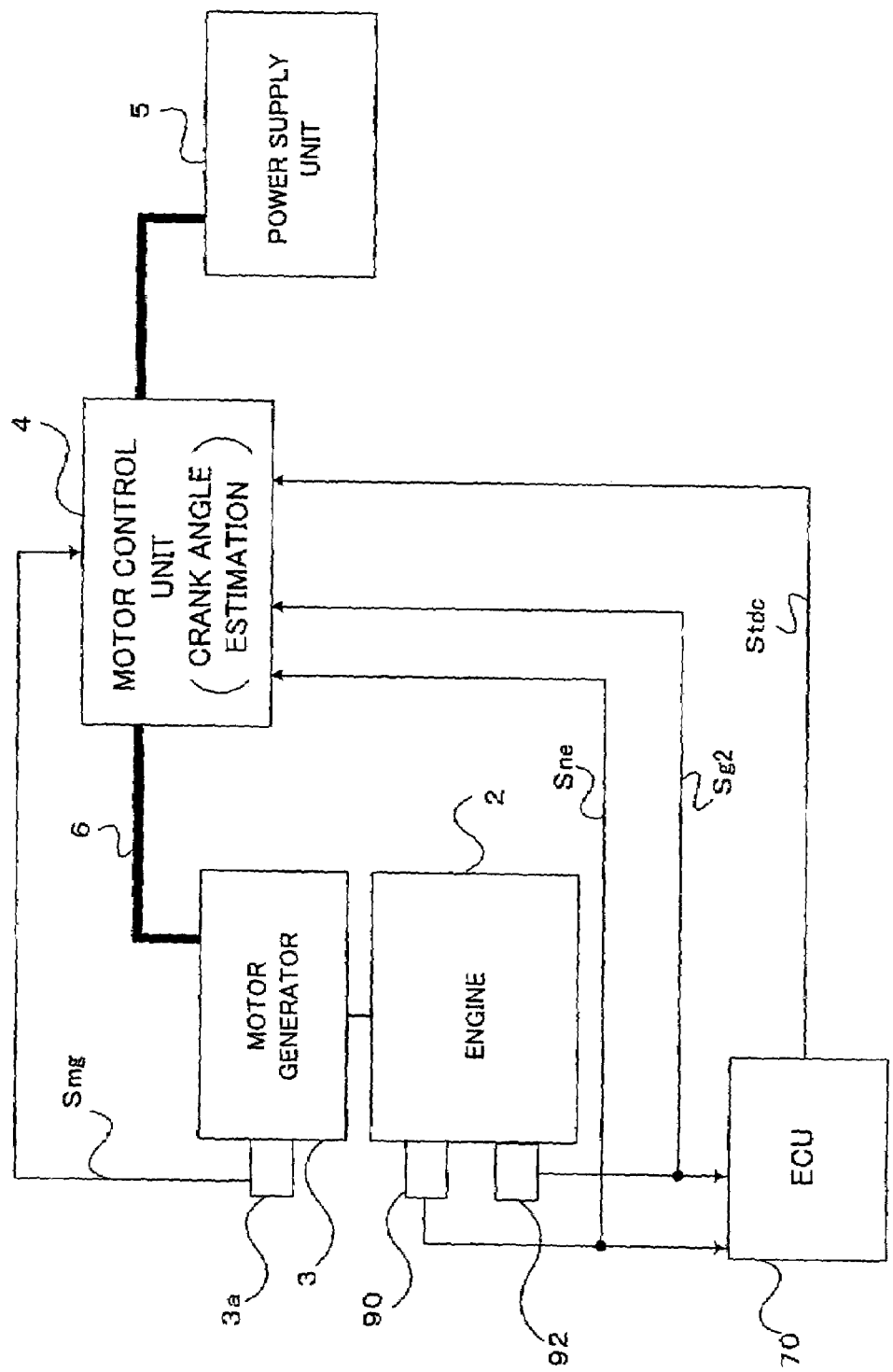
FIG. 7 is a block diagram showing a configuration example of the engine stop position estimating apparatus according to an embodiment of the present invention.

Next, engine stop position estimating processing which is a main part of the present invention will be explained. FIG. 7 shows a schematic configuration of an engine stop position estimating apparatus according to the present invention. In this embodiment, a motor control unit 4 executes the engine stop position estimating processing. Specifically, the motor control unit 4 estimates the engine stop position, namely, the crank angle at the time of stopping the engine based on the MG position signal Smg outputted from the motor angle sensor 3a, the NE signal Sne outputted from the crank angle sensor 90, the cam angle signal (G2 signal) Sg2 outputted from the cam angle sensor 92 and the TDC signal Stdc generated in the ECU 70. The TDC signal includes two signals (a TDC 1 signal and a TDC 2 signal) which will be described later.

FIG. 8 is a table in which the characteristics of the MG position signal, the NE signal, the G2 signal and the TDC signal described above are organized.

The MG position signal is the signal which is outputted from the motor angle sensor 3a of the motor generator 3 and indicates the rotation angle of the motor shaft. The shaft of the motor generator 3 is connected to the MG pulley 58 as shown in FIG. 2, and is interlocked by the belt 52 with the crankshaft pulley 50 connected to the crankshaft 46. While the MG position signal cannot indicate an absolute angle of the crankshaft because there exists a slip amount of the belt connecting the MG pulley 58 and the crankshaft pulley 50, the MG position signal can indicate a relative angle of the crankshaft. According to the MG position signal, the crank angle can be detected with resolution of about 3° CA, although the resolution depends on a pulley ratio of the MG pulley 58 and the crankshaft pulley 50. Also, since it can be discriminated from the MG position signal whether the motor is rotated in the normal direction or the reverse direction as described above, a reverse rotation signal indicating whether the motor is rotated in the normal direction or the reverse direction can be generated.

The NE signal is a detection signal of the teeth 91a of the signal rotor 91 attached to the crankshaft 46 as described above, with which the absolute crank angle can be detected with resolution of about 10° CA to 30° CA in accordance with the number of teeth 91a provided at the signal rotor 91.

The cam angle signal (G2) is mainly utilized as a cylinder discrimination signal as described above. Since the camshaft and the crankshaft are connected with each other by a timing belt, a timing chain and the like, the G2 signal is basically the signal corresponding to the absolute crank angle. However, in the case of the engine employing a variable valve mechanism (VVT), the G2 signal includes the timing shift.

The TDC signal is the signal which the ECU 70 or the like generates based on the NE signal outputted by the crank angle sensor 90, and the TDC signal indicates the time cycle of the TDC. Consequently, 360° CA of the absolute crank angle can be detected with the TDC signal.

When an MPU sensor is used as the crank angle sensor 90 and the cam angle sensor 92, the sensor output cannot be obtained while the number of engine revolution (crankshaft revolution) is low. However, in the case of using an MRE sensor, the sensor output can be obtained even when the number of engine revolution (crankshaft revolution) is low, and hence each signal can be obtained.

(Crank Angle Estimation)

Next, a basic crank angle estimating method according to the present invention will be explained. The present invention estimates the crank angle in consideration of the reverse rotation of the engine, and this will be explained with reference to FIGS. 9A and 9B. It is known that an engine generally rotates in reverse just before the engine stop in most cases when the engine is stopped at the time of idling stop and the like. This is the same in the stop control method utilizing the aforementioned inertia energy. The crank angle sensor can detect the absolute angle of the crankshaft, but cannot detect the rotation direction of the crankshaft. Namely, the crank angle sensor cannot detect whether the crankshaft rotates in the normal direction or the reverse direction. Unless the engine stop position is estimated by detecting the reverse rotation of the crankshaft, the crank angle is calculated on such a premise that the crankshaft is rotated in the normal direction, even if the crankshaft is actually rotated in the reverse direction just before the engine stops, and therefore the crank angle at the time of stopping the engine cannot be accurately estimated. Actually, even when the crank angle is detected within the area where the number of engine revolution is low by utilizing the MRE sensor and the like, unless it can be detected that the crankshaft is rotated in reverse by the compression reaction force and the like, the crank angle is added though the crankshaft is actually rotated in the reverse direction, and an error occurs to the estimation result of the engine stop position. In the present invention, the crank angle at the time of stopping the engine can be accurately estimated by utilizing the reverse rotation signal which the motor angle sensor 3a outputs.

Figure 9A:
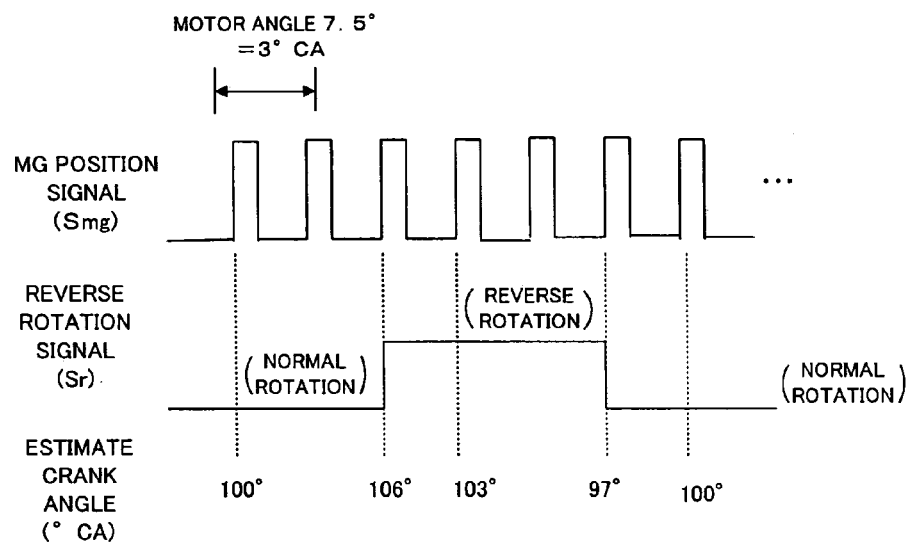
FIGS. 9A and 9B are diagrams for showing a crank angle estimation example with detection of reverse rotation of the engine.
Figure 9B:
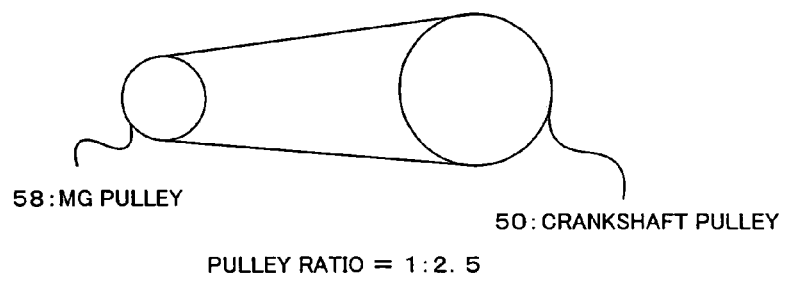

FIG. 9A shows an example in which the crank angle is estimated based on the MG position signal outputted by the motor angle sensor 3a and the reverse rotation signal generated from the MG position signal. In this example, the pulley ratio of the MG pulley 58 and the crankshaft pulley 50 is assumed to be 1:2.5 as shown in FIG. 9B. From this pulley ratio, 2.5 rotations of the shaft of the motor generator 3 correspond to one rotation of the crankshaft 46, and the rotation angle of 7.5° of the motor generator 3 corresponds to the crank angle of 3° CA In FIG. 9A, when it is assumed that the MG position signal outputs a pulse at each rotation angle of 7.5° of the motor generator (called "motor rotation angle"), one pulse period of the MG position signal corresponds to the crank angle of 3° CA In the stop position estimation, namely, the crank angle estimating processing at the time of stopping the engine, the crank angle is added and subtracted with reference to the reverse rotation signal as shown in FIG. 9A, whereby the accurate crank angle can be obtained.

FIG. 9A shows the waveform examples of the MG position signal and the reverse rotation signal in the case where, for example, the crankshaft rotated in the normal direction is rotated in reverse at the position of the estimate crank angle of 106° and rotated by the crank angle of 9° CA, and then is rotated in reverse again to be rotated in the normal direction. Even when the rotation of the engine causes reverse rotation at the time just before the engine stop or the like, if the arithmetic operation of the crank angle is performed by utilizing the reverse rotation signal outputted from the motor angle sensor, it is possible to estimate the accurate crank angle at the time of the engine stop.

In the example shown in FIGS. 9A and 9B, the crank angle is arithmetically operated by combining the MG position signal and the reverse rotation signal, but the crank angle may be estimated by combining the NE signal or the TDC signal, instead of the MG position signal, with the reverse rotation signal. Namely, by performing arithmetic operation of the signals indicating the crank angle, not limited to the MG position signal, in consideration of the reverse rotation signal obtained from the motor angle sensor, the accurate crank angle can be calculated even when the crankshaft is rotated in reverse at the time of stopping of the engine.

FIRST EXAMPLE

Next, a first example of the present invention will be explained. The first example is to perform crank angle estimation with high accuracy by combining the outputs of the motor angle sensor at the side of the motor generator and the crank angle sensor and the cam angle sensor at the side of the engine.

As shown in Table in FIG. 8, it is the MG position signal that can detect the crank angle with the highest accuracy. However, the absolute crank angle cannot be obtained from the MG position signal. Consequently, the crank angle is calculated by the MG position signal having the highest accuracy, and correction is performed by using the TDC signal or the NE signal which shows the absolute crank position, whereby the crank angle is estimated with high accuracy.

FIG. 10 shows the concrete example. With the MG position signal, the crank angle can be detected with the resolution of 3° CA as described above. Accordingly, the crank angle is basically calculated based on the MG position signal. On this occasion, the crank angle is calculated in consideration of the rotation direction of the engine, by utilizing the reverse rotation signal.

Meanwhile, the NE signal is the signal obtained by detecting the teeth 91a of the signal rotor 91 attached to the crankshaft 46, and pulse output does not exist at the portion of the lacked tooth 91b (corresponding to two pulses in this example). The portion of the lacked tooth 91b corresponds to the position just before the top dead center (TDC) in a specific cylinder of the engine 2. Therefore, as shown in FIG. 10, the top dead center of the cylinder is located just after the portion of the NE signal corresponding to the lacked tooth. Consequently, the ECU 70 generates the TDC signal shown in FIG. 10, namely, the signal outputting the pulse corresponding to the top dead center in the cylinder at every 360° CA, based on the NE signal. Further, the ECU 70 divides the TDC signal to generate a signal whose level changes at every 180° CA (a TDC2 signal in FIG. 10). The TDC signal and the TDC2 signal indicate the absolute crank angle. Consequently, the crank angle signal obtained based on the MG position signal with high resolution is corrected based on the TDC signal or the TDC2 signal. Thus, the absolute crank angle with high accuracy can be obtained.

Specifically, the timing of 180° CA of the crank angle obtained based on the MG position signal (hereinafter, called "MG estimate crank angle") and the timing of 180° CA which the TDC2 signal indicates are compared, as shown in FIG. 10. Since the MG position signal includes an accumulative error due to the slip of the belt connecting the MG pulley and the crankshaft pulley, and the error amount is corrected based on the TDC 2 signal. Namely, the crank angle estimation is performed in the high accuracy unit (3° CA in this example) based on the MG position signal, and the MG estimate crank angle thus obtained is corrected at every 180° CA based on the TDC2 signal which gives the absolute crank angle. In practice, it is suitable to count up the MG estimate crank angle based on the MG position signal and reset the MG estimate crank angle at every 180° CA based on the TDC2 signal.

The above-described method of generating the TDC2 signal to perform the correction at every 180° CA is only an example. Any method can be adopted, which corrects the MG estimate crank angle signal by utilizing the signal based on the NE signal or the TDC signal indicating the absolute crank angle. For example, a signal which changes in the level at every 90° CA may be generated based on the TDC signal, and the MG estimate crank angle signal may be corrected at every 90° CA by using this signal. The MG estimate crank angle signal may be corrected at every 30° CA by using the NE signal itself having the accuracy of 30° CA Alternatively, the MG estimate crank angle may be corrected at every 720° CA by using the G2 signal. Since the G2 signal is the cylinder discrimination signal, the MG estimate crank angle can be corrected and the cylinder discrimination can be performed at the same time, by using the G2 signal, thereby to recognize the stroke of each cylinder at the time of stopping the engine.

Since the MG position sensor can detect the motor rotation angle at the time when the number of engine revolution is low (see FIG. 8), it becomes possible to estimate the crank angle accurately from the time of low engine revolution to the stop of the engine, irrespective of whether the MPU sensor or the MRE sensor is used for the crank angle sensor and the cam angle sensor.

Figure 11:
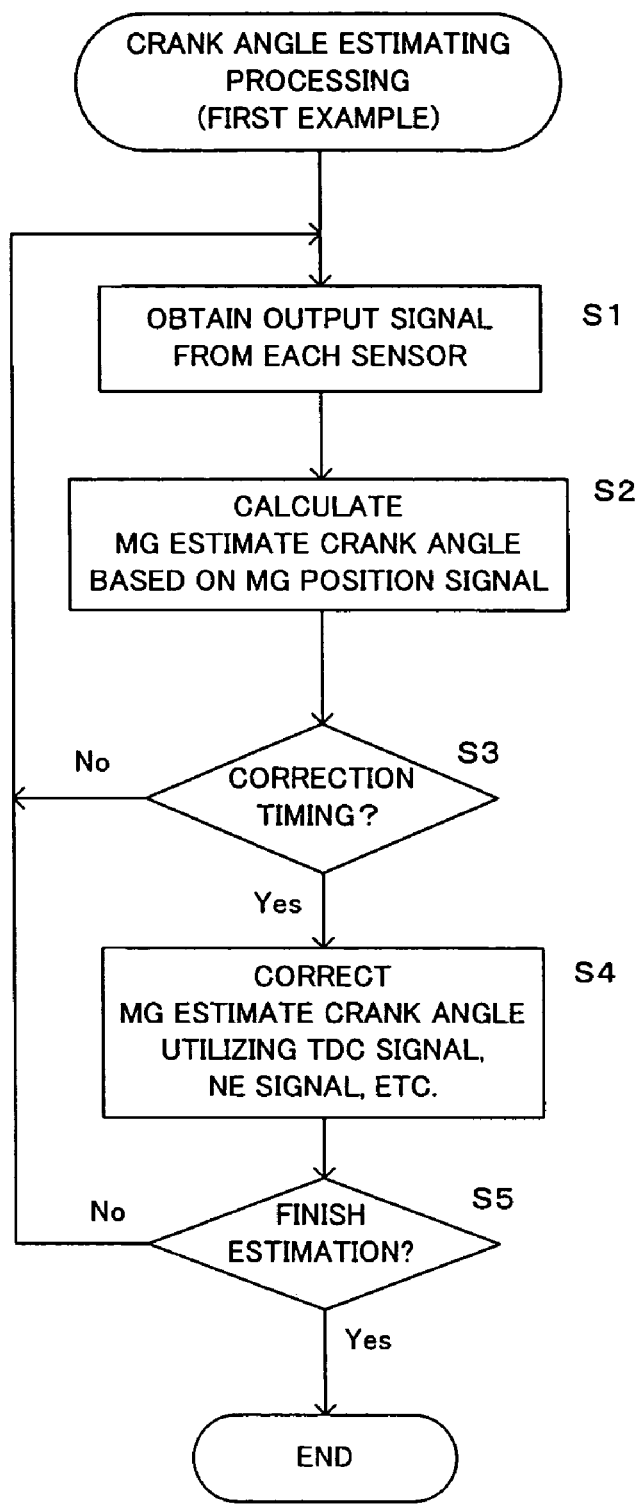
FIG. 11 is a flow chart of a first example of the crank angle estimating processing.

Next, the flow of the aforementioned crank angle estimating processing will be explained with reference to a flow chart in FIG. 11. This processing is performed by the motor control unit 4 by utilizing the signals outputted from each of the sensors and the ECU as shown in FIG. 7.

First, the motor control unit 4 receives the MG position signal Smg from the motor angle sensor 3a, receives the NE signal Sne from the crank angle sensor 90, receives the G2 signal Sg2 from the cam angle sensor 92, and receives the TDC signal Stdc from the ECU (step S1). Then, the motor control unit 4 calculates the MG estimate crank angle based on the MG position signal (step S2). On this occasion, the motor control unit 4 generates the reverse rotation signal based on the MG position signal, and calculates the MG estimate crank angle in consideration of the rotation direction of the crankshaft. This step is performed continuously based on the MG position signal, and the MG estimate crank angle is continuously calculated.

Next, the motor control unit 4 determines whether the correction timing of the MG estimate crank angle arrives or not (step S3). The correction timing differs for each signal used for correction. For example, in case that the motor control unit 4 corrects the MG estimate crank angle at every 180° CA based on the aforementioned TDC2 signal, the motor control unit 4 monitors the TDC2 signal, and determines the correction timing when it detects the level change of the TDC2 signal. In case that the motor control unit 4 corrects the MG estimate crank angle by utilizing the NE signal, it determines that the correction timing arrives at each pulse of the NE signal. When the motor control unit 4 determines the correction timing (step S3; Yes), the motor control unit 4 corrects the MG estimate crank angle by utilizing the TDC signal, the NE signal and the like (step S4). In the example of FIG. 10, at the time of level change of the TDC2 signal, the motor control unit 4 resets the MG estimate crank angle so that the absolute crank angle which the TDC 2 signal indicates coincides with the MG estimate crank angle. Until the instruction to finish the estimate processing is given, the processing from steps S1 to S4 is continued. Namely, the MG estimate crank angle is calculated, and the correction is repetitively performed. As a result, the motor control unit 4 can estimate the absolute crank angle with high accuracy in consideration of the reverse rotation of the crankshaft.

On the occasion of the stop control of the vehicle, this crank angle estimating processing is continuously performed. Then, the crank angle estimating processing is finished when, for example, it is detected that the vehicle is stopped, and the value of the MG estimate crank angle at that time indicates the engine stop position. It is noted that the crank angle estimating processing is, of course, executable on the occasion other than the case of stopping the engine.

SECOND EXAMPLE

Next, a second example of the present invention will be explained. The second example is to perform the correction of the MG estimate crank angle in the crank angle estimating processing shown in the first example only when the number of engine revolution is within the predetermined range.

As described above, in the first example, the MG estimate crank angle is calculated based on the MG position signal to estimate the crank angle with high accuracy, and the MG estimate crank angle thus calculated is corrected according to the TDC signal and the like. However, in the state that the number of engine revolution is high (for example, 4,000 rpm or more), the arithmetic operation load of estimating the MG estimate crank angle and its correction processing becomes excessively large. On the other hand, when the number of engine revolution is too low, the reliability of the output signal from the crank angle sensor is low. The accuracy of output of an ordinary crank angle sensor tends to decrease at the number of engine revolution lower than, for example, about 300 rpm. Therefore, the correction of the MG estimate crank angle is performed only when the number of engine revolution is within a predetermined range. As a result, it is possible to avoid the problems that the arithmetic operation load required for the crank angle estimating processing becomes excessively large due to excessively high engine revolution number to interfere with the other processing and the correction accuracy of the MG estimate crank angle cannot be ensured due to excessively low engine revolution number.

Especially, when this crank angle estimating processing is performed during the engine stop control by utilizing the aforementioned inertia energy, the number of engine revolution is stabilized within a suitable range during motoring. Therefore, by executing the correction during that time, the crank angle estimation (namely, the engine stop position estimation) at the time of stopping the engine can be performed with favorable accuracy.

Figure 12:
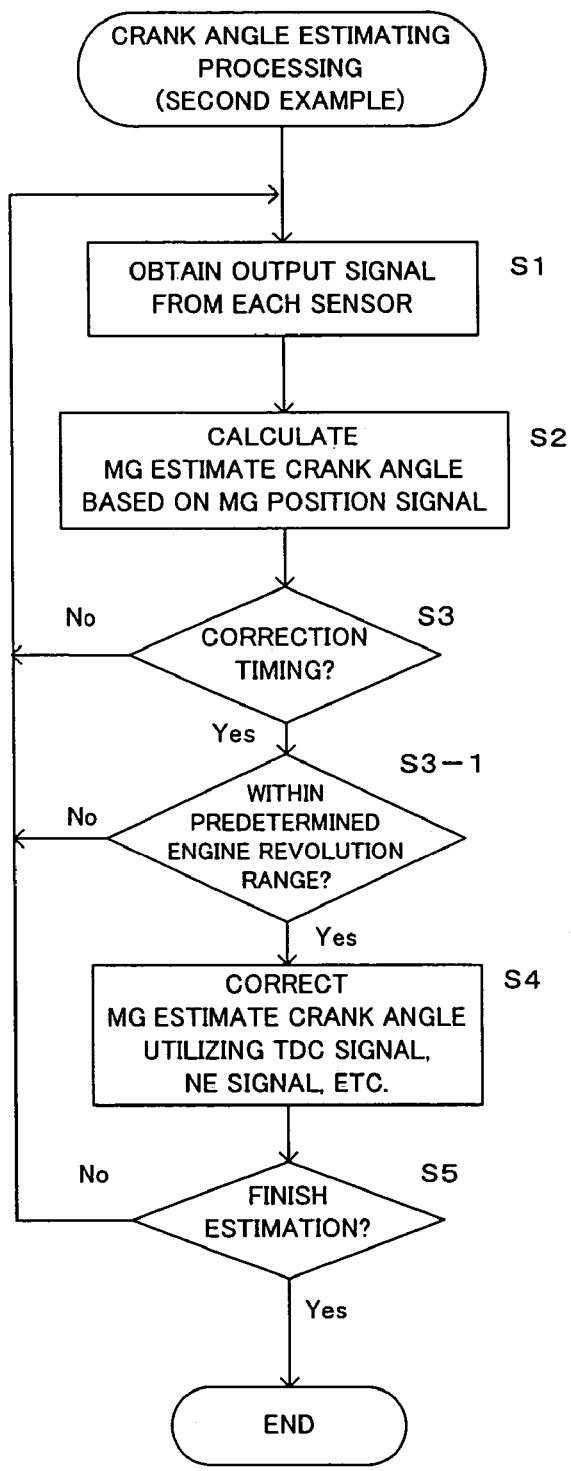
FIG. 12 is a flow chart of a second example of the crank angle estimating processing.

FIG. 12 shows a flow chart of the crank angle estimating processing in this example. The flow chart of the second example shown in FIG. 12 is the same as the flow chart of the first example shown in FIG. 11 except for that step S3-1 is inserted. Namely, when the correction timing arrives (step S3; Yes), the motor control unit 4 receives the number of engine revolution from the ECU 70, and determines whether it is within the predetermined range or not (step S3-1). The predetermined range of the number of engine revolution may be, for example, 300 to 2000 rpm. When the number of engine revolution is within the predetermined range, the motor control unit 4 corrects the MG estimate crank angle (step S4). When the number of engine revolution is not within the predetermined range, the motor control unit 4 does not perform correction, and returns to step S1.

THIRD EXAMPLE

Next, a third example of the present invention will be explained. In the third example, in the crank angle estimating processing in the first example, the error when the MG estimate crank angle is corrected is recorded, and a standard error range is determined. When a large error exceeding the standard error range is detected, it is determined to be caused by a temporary factor such as a noise, for example, and correction is not performed. As for the errors included in the MG estimate crank angle, an error caused by the slip of the belt 52 connecting the MG pulley 58 and the crankshaft pulley 50, and an arithmetic operation error when the MG estimate crank angle is calculated based on the MG position signal are basically conceivable. However, it is considered that the error due to the slip of the belt stays within a certain range in accordance with the structure of the belt and the pulley portions, and that the arithmetic operation error of the MG estimate crank angle also stays within a certain range. Therefore, when a large error exceeding such a range is temporarily detected, it is not considered to be an error which regularly occurs but is rather considered to be caused by the other sudden factor such as a noise.

The sudden factor responsible for the error may be a noise in the output signal from the crank angle sensor. Another factor may be the influence of the lacked tooth 91*b* of the signal rotor 91. As shown in FIG. 4D and FIG. 10, the NE signal does not include pulse in the portions corresponding to the lacked tooth 91*b* of the signal rotor 91. The ECU 70 detects the portions corresponding to this lacked tooth 91*b*, namely, the portions in which the pulse does not exist for a predetermined period, and generates the TDC signal (see FIG. 10). However, when the engine speed suddenly changes, for example, during stop control of the engine and the like, a time interval between the pulses included in the NE signal suddenly varies. When the number of engine revolution suddenly decreases, even in the portion provided with the teeth 91*a*, which is not the lacked tooth portion, the time interval between the pulses adjacent to each other with respect to time in the NE signal becomes long, and it is likely to occur that the ECU 70 erroneously determines this as the pulse absence portion due to the lacked tooth and generates an erroneous TDC signal. In such a case, the MG estimate crank angle and the crank angle indicated by the TDC signal and the like include a large error exceeding the standard error level.

In this view, in this example, when the MG estimate crank angle is corrected by utilizing the TDC signal and the like, the error at that time is stored, and the standard error range is determined based on the errors of the several detections. Namely, the standard error range includes the error of such a level as is considered to be caused by the aforementioned slip of the belt, or the arithmetic operation error at the time of calculating the MG estimate crank angle. When an error exceeding the standard error range is detected during the correction of the MG estimate crank angle, the correction of that time is not performed. This can exclude a sudden error caused by a noise and the aforementioned lacked tooth of the signal rotor. The error exceeding such a standard error range appears suddenly in ordinary cases, but when it is repeatedly detected, it is possible to assume that a new cause of such an error occurs, and in that case, correction may be executed and such a large error may be steadily corrected.

Figure 13:
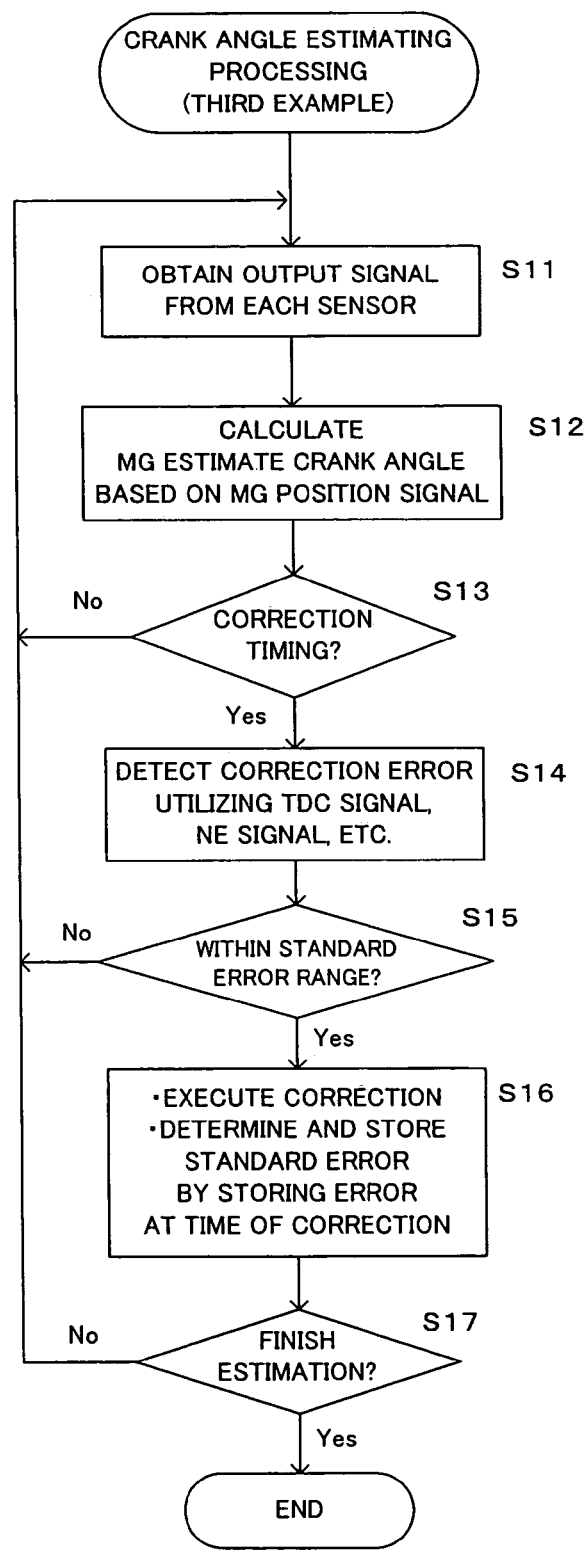
FIG. 13 is a flow chart of a third example of the crank angle estimating processing.

A flow chart of the crank angle estimating processing according to this example is shown in FIG. 13. In FIG. 13, steps S11 to S13 are the same as steps S1 to S3 in the first example shown in FIG. 11. When the correction timing arrives, the motor control unit 4 detects an error of the MG estimate crank signal and the TDC signal and the like used for correction before executing the correction (step S14), and determines whether it is within the aforementioned standard error range or not (step S15). Only when it is within the standard error range (step S15; Yes), correction is executed (step S16). The motor control unit 4 stores the error at the time of correction, and utilizes it for the determination, updating and the like of the standard error range. When the instruction to finish the estimating processing occurs, the processing is finished (step S17).

For a predetermined time period after the start of the crank angle estimating processing, the standard error range has not been determined yet, and therefore it is necessary to execute correction, with setting the result in step S15 to "Yes" for all errors. After the standard error range is determined based on the error obtained by correction of predetermined times, it is suitable to perform determination of whether correction is to be performed or not based on the standard error range in step S15.

FOURTH EXAMPLE

A fourth example is a modified example of the third example, and is to generate a state signal indicating whether the crank angle estimating processing is performed stably or not, namely, whether the accuracy of the crank angle estimation is sufficient or not based on the error at the time of correcting the MG estimate crank angle.

As described above, while the crank angle estimating processing is stably executed with high accuracy, the error between the MG estimate crank angle and the absolute crank angle obtained based on the TDC signal or the like stays within the aforementioned standard error range. Conversely, when the error does not stay within the standard error range, it can be considered that the crank angle estimating processing is in an unstable state, namely, in a state in which the estimate accuracy is not sufficient and the estimated result is not reliable due to some factor. Therefore, the motor control unit 4 sets a state flag such as an estimation accuracy flag. When the error is within the standard error range in step S15 in FIG. 13, the estimation accuracy flag is set to be ON (indicating the state in which the estimation accuracy is ensured), and when the error is outside the standard error range, the estimation accuracy flag is set to be OFF (indicating the state in which the estimation accuracy is insufficient). Consequently, it can be known more easily by referring to the estimation accuracy flag whether the estimated result of the crank angle estimating processing executed during stop position control is reliable or not.

Based on the estimation accuracy flag, various countermeasures can be taken. For example, when the estimation accuracy flag is OFF during engine stop control such as idling stop, the engine stop position estimation result at this time is determined to be unreliable and the engine stop control may be discontinued. Also, when the estimation accuracy flag is OFF, predetermined processing may be executed when starting the engine next time.

MODIFIED EXAMPLE

Figure 14:
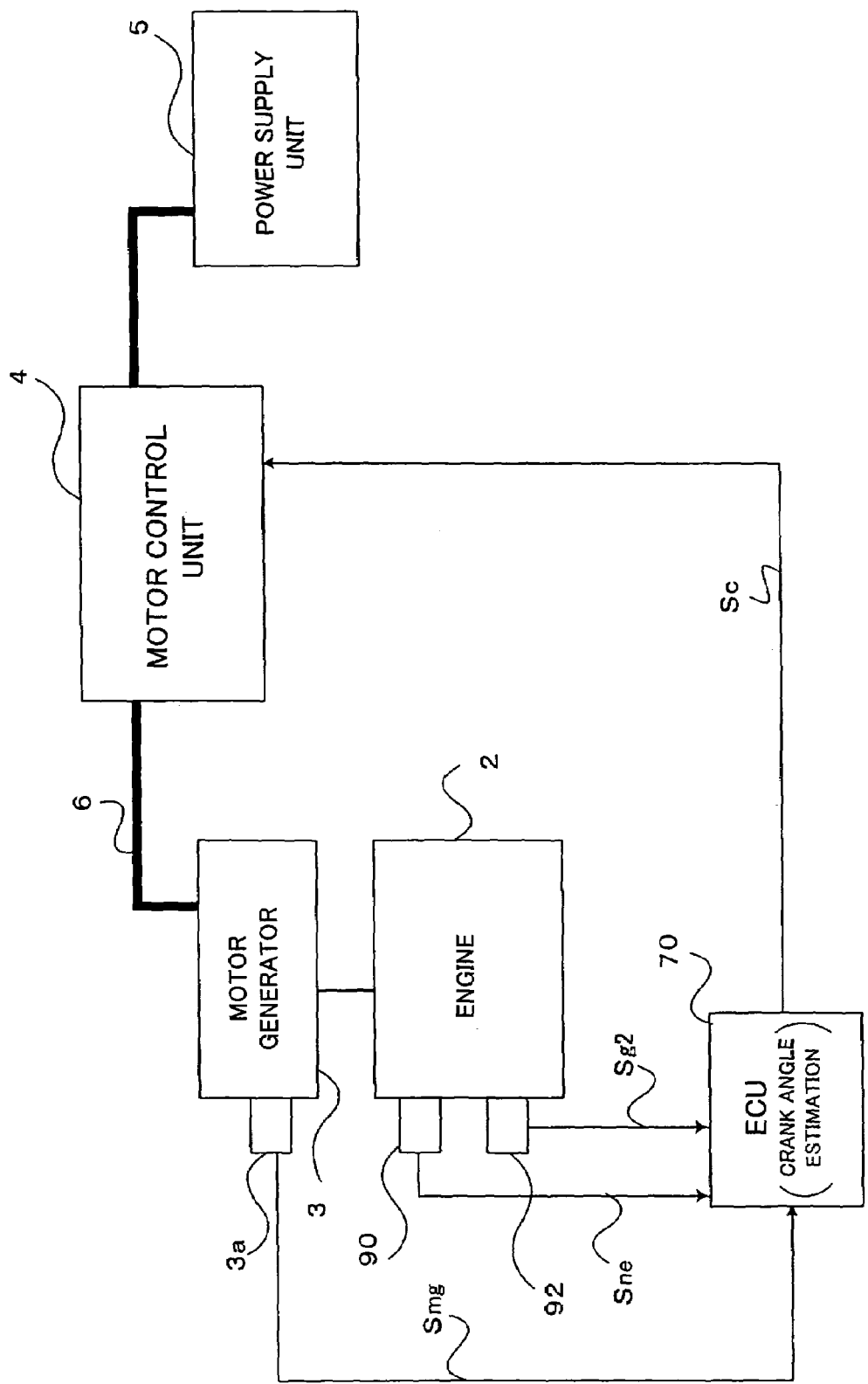
FIG. 14 is a block diagram showing another configuration example of the engine stop position estimating apparatus according to the embodiment of the present invention.

In the above-described examples, as shown in FIG. 7, the MG position signal Smg from the motor angle sensor 3a, the NE signal Sne from the crank angle sensor 90, the G2 signal Sg2 from the cam angle sensor 92, and the TDC signal Stdc from the ECU 70 are supplied to the motor control unit 4, and the motor control unit 4 executes the aforementioned crank angle estimating processing. On the contrary, the ECU 70 may execute the crank angle estimating processing. The configuration in that case is shown in FIG. 14. When the ECU 70 executes the crank angle estimating processing, the MG position signal Smg from the motor angle sensor 3a, the NE signal Sne from the crank angle sensor 90 and the G2 signal Sg2 from the cam angle sensor 92 are supplied only to the ECU 70. The ECU 70 utilizes these signals and the TDC signal which the ECU 70 itself generates based on the NE signal, and executes the aforementioned crank angle estimating processing. Then, if necessary, the ECU 70 supplies the control instruction signal Sc to the motor control unit 4, thereby to control the motor generator 3 based on the estimation result. The motor control unit 4 drives the motor generator 3 based on the control instruction signal Sc, and executes the stop control, start control and the like of the engine.

In the above-described explanation, the economic-running vehicle and the hybrid vehicle having the motor generators interlocked with the crankshafts of the engines are shown as examples. However, the present invention can be applied to the vehicle which has a motor for the purpose of only starting the engine and does not have an electric power generation function connected to the crankshaft.

As explained above, according to the engine stop position estimating apparatus of the present invention, since the reverse rotation of the engine is detected by the motor angle sensor for detecting the rotation of the motor generator and the crank angle is estimated in consideration of the rotation direction of the engine, the engine stop position can be accurately estimated. Also, since the crank angle is estimated by correcting the high resolution relative crank angle obtained based on the motor position signal with the absolute crank angle obtained based on the crank angle sensor or the like, the absolute crank angle can be estimated with high accuracy. As a result, the stop position of the engine at the time of idling stop and the like can be estimated with high accuracy. Further, the sensors necessary for the estimation are those ordinarily used, and the arithmetic operation itself is not so complicated, and hence the estimation can be executed at low cost.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2003-016037 filed on Jan. 28, 2002 including the specification, claims, drawings and summary is incorporated herein by reference in its entirety.

What is claimed is:

1. A stop position estimating apparatus of an internal combustion engine comprising:
   a motor generator having a function of at least one of a motor and a generator interlocked with a crankshaft of the internal combustion engine;
   a first detecting unit for detecting a rotation position of the motor generator;
   a second detecting unit for detecting a crank angle of the crankshaft;
   a rotation direction detecting unit for detecting a rotation direction of the internal combustion engine based on the rotation position detected by the first detecting unit, and
   an estimating unit for estimating a stop position of the internal combustion engine based on the rotation position of the motor generator and the crank angle, wherein the estimating unit estimates the stop position of the internal combustion engine based on the crank angle generated by counting a number of crank pulses in the rotation direction of the internal combustion engine detected by the rotation direction detecting unit.

2. The stop position estimating apparatus of an internal combustion engine according to claim 1, further comprising:
   a rotation direction detecting unit for detecting a rotation direction of the internal combustion engine based on the rotation position detected by the first detecting unit, wherein the estimating unit estimates the stop position of the internal combustion engine based on the rotation direction and the crank angle detected by the second detecting unit.

3. The stop position estimating apparatus of an internal combustion engine according to claim 1, further comprising:
   a crank angle estimating unit for estimating a crank angle of the internal combustion engine based on the rotation position detected by the first detecting unit; and a correcting unit for correcting the estimated crank angle based on the crank angle detected by the second detecting unit.

4. The stop position estimating apparatus of an internal combustion engine according to claim 3, further comprising:
   a unit for detecting a number of revolution of the internal combustion engine,
   wherein the correcting unit corrects the estimated crank angle only when the detected number of revolution is within a predetermined range.

5. The stop position estimating apparatus of an internal combustion engine according to claim 3,
   wherein the correcting unit corrects the estimated crank angle so that the crank angle estimated by the crank angle estimating unit coincides with the crank angle detected by the second detecting unit.

6. The stop position estimating apparatus of an internal combustion engine according claim 3,
   wherein the correcting unit does not perform correction of the estimated crank angle when an error between the crank angle estimated by the crank angle estimating unit and the crank angle detected by the second detecting unit is larger than a predetermined standard error.

7. The stop position estimating apparatus of an internal combustion engine according to claim 3, further comprising:
   a unit for outputting estimation accuracy information indicating that the estimation accuracy is ensured when an error between the crank angle estimated by the crank angle estimating unit and the crank angle detected by the second detecting unit is within a predetermined standard error range.

8. The stop position estimating apparatus of an internal combustion engine according to claim 6, wherein the correcting unit comprises:
   an error detecting unit for detecting the error between the crank angle estimated by the crank angle estimating unit and the crank angle detected by the second detecting unit; and
   a unit for determining the standard error based on a predetermined number of detected errors.

* * * * *